US012684273B2

(12) United States Patent
Corynen

(10) Patent No.: US 12,684,273 B2
(45) Date of Patent: Jul. 14, 2026

(54) DIPOLE LOUDSPEAKER ASSEMBLY

(71) Applicant: PSS BELGIUM NV, Dendermonde (BE)

(72) Inventor: David Corynen, Dendermonde (BE)

(73) Assignee: PSS BELGIUM NV, Dendermonde (BE)

(*) Notice: Subject to any disclaimer, the term of this patent is extended or adjusted under 35 U.S.C. 154(b) by 494 days.

(21) Appl. No.: 18/041,686

(22) PCT Filed: Jul. 2, 2021

(86) PCT No.: PCT/EP2021/068397
§ 371 (c)(1),
(2) Date: Feb. 14, 2023

(87) PCT Pub. No.: WO2022/048810
PCT Pub. Date: Mar. 10, 2022

(65) Prior Publication Data

US 2024/0031712 A1 Jan. 25, 2024

(30) Foreign Application Priority Data

Sep. 7, 2020 (GB) ..................................... 2014020

(51) Int. Cl.
*H04R 1/02* (2006.01)
*H04R 1/28* (2006.01)
(Continued)

(52) U.S. Cl.
CPC ............. *H04R 1/025* (2013.01); *H04R 1/023* (2013.01); *H04R 1/2873* (2013.01); *H04R 7/16* (2013.01); *H04R 9/04* (2013.01); *H04R 2499/13* (2013.01)

(58) Field of Classification Search
CPC ...... H04R 1/025; H04R 1/023; H04R 1/2873; H04R 7/16; H04R 9/04; H04R 2499/13
See application file for complete search history.

(56) References Cited

U.S. PATENT DOCUMENTS 4,590,332 A 5/1986 Delbuck
5,081,684 A 1/1992 House
(Continued)

FOREIGN PATENT DOCUMENTS

CN 103227973 A 7/2013
GB 577358 A 5/1946
(Continued)

OTHER PUBLICATIONS

International Search Report and Written Opinion mailed Feb. 2, 2022, issued in corresponding International Application No. PCT/EP2021/068379, filed Jul. 2, 2021, 23 pages.
(Continued)

*Primary Examiner* — Fan S Tsang
*Assistant Examiner* — Tyler Michael Liebgott
(74) *Attorney, Agent, or Firm* — Christensen O'Connor Johnson Kindness PLLC

(57) ABSTRACT

A dipole loudspeaker assembly for producing sound at bass frequencies is provided. The dipole loudspeaker can include a diaphragm having a first radiating surface and a second radiating surface located on opposite faces of the diaphragm. The dipole loudspeaker includes a drive unit, wherein the sound produced by the first radiating surface is in anti-phase with sound produced by the second radiating surface. The diaphragm is suspended from the drive unit frame via at least one drive unit suspension. The dipole loudspeaker includes a mounting frame suspension, at least partially overlaps with one or more elements selected from the diaphragm and at least one drive unit suspension as projected onto the same plane, and is formed in a gap between the drive unit frame and the mounting frame and extends substantially continuously around the drive unit frame.

21 Claims, 18 Drawing Sheets

(51) Int. Cl.
*H04R 7/16* (2006.01)
*H04R 9/04* (2006.01)

(56) References Cited

U.S. PATENT DOCUMENTS

| | | | | | |
|---|---|---|---|---|---|
| 5,887,071 | A * | 3/1999 | House | H04R 5/02 381/87 |
| 8,774,447 | B2 | 7/2014 | Ko | |
| 2003/0142835 | A1* | 7/2003 | Enya | H04R 3/12 381/387 |
| 2005/0152570 | A1 | 7/2005 | Yu et al. | |
| 2008/0273712 | A1* | 11/2008 | Eichfeld | H04S 7/302 381/86 |
| 2008/0292121 | A1* | 11/2008 | Yokota | H04R 5/04 381/301 |
| 2009/0136075 | A1 | 5/2009 | Meyer | |
| 2017/0341592 | A1* | 11/2017 | Ito | B60R 13/07 |
| 2019/0111820 | A1* | 4/2019 | Subat | H04R 5/023 |

FOREIGN PATENT DOCUMENTS

| | | | | |
|---|---|---|---|---|
| GB | 2497315 | A | 6/2013 | |
| GB | 2549078 | A | 10/2017 | |
| WO | 96/14722 | A1 | 5/1996 | |
| WO | 2005/015950 | A1 | 2/2005 | |
| WO | 2008/082304 | A2 | 7/2008 | |
| WO | 2008/135857 | A1 | 11/2008 | |
| WO | 2012/051217 | A2 | 4/2012 | |
| WO | WO-2012110667 | A1 * | 8/2012 | H04R 1/02 |
| WO | 2019/121072 | A1 | 6/2019 | |
| WO | WO-2019121266 | A1 * | 6/2019 | H04R 1/32 |
| WO | 2019/192808 | A1 | 10/2019 | |
| WO | 2020/239766 | A1 | 12/2020 | |
| WO | WO-2021185777 | A1 * | 9/2021 | H04R 1/025 |
| WO | WO-2021249843 | A1 * | 12/2021 | H04R 1/347 |

OTHER PUBLICATIONS

"AN 32 Effective Radiating Area Sd," Application Note to the Klippel R&D System, Apr. 4, 2012, 5 pages.

Office Action mailed Apr. 18, 2025, in corresponding Chinese application No. 2021800549638, filed Jul. 2, 2021, 14 pages.

* cited by examiner

DIPOLE LOUDSPEAKER ASSEMBLY

This application is a National Stage of International Application No. PCT/EP2021/068397, filed Jul. 2, 2021, which claims priority to GB2014020.8 filed 7 Sep. 2020, the entirety of which are hereby incorporated by reference for all purposes.

FIELD OF THE INVENTION

The present invention relates to a dipole loudspeaker for producing sounds at bass frequencies.

BACKGROUND

Among the frequencies in the audible spectrum, lower frequencies are the ones that tend to carry most over large distances and are the ones difficult to keep inside a room. For example, nuisance from neighbouring loud music has mostly a low frequency spectrum. “Low” frequencies can also be referred to as “bass” frequencies and these terms may be used interchangeably throughout this document.

Many cars today are equipped with a main audio system, which typically consists of a central user interface console with internal or external audio amplifiers, and one or more loudspeakers placed in the doors. This type of audio system is used to ensure enough loudness of the same content (e.g. radio) for all passengers.

Some cars include personal entertainment systems (music, games & television) which are typically equipped with headphones to ensure individual passengers receive personalised sound, without disturbing (or being disturbed by) other passengers who are enjoying a different audio-visual content.

However, although the usage of headphones ensures a good sound quality and a very effective personal sound cocoon (little sound leakage), the use of headphones has safety, ergonomic and comfort problems. Similar considerations apply in other environments such as home, studio, and public areas where individual entertainment is needed without disturbing neighbours.

Some cars include loudspeakers placed very close to an individual passenger, so that sound having an adequately high sound pressure level (“SPL”) can be obtained at the ears of that individual passenger, whilst having a much lower SPL at the positions of other passengers.

The present inventor has observed that the concept of a personal sound cocoon is a useful way to understand the approach of having a loudspeaker placed close to a user, wherein the personal sound cocoon is a region in which a user is able to experience sound having an SPL deemed to be acceptably high for their enjoyment, whereas outside the personal sound cocoon the sound is deemed to have an SPL which is lower than it is within the personal sound cocoon.

It is known that the use of a highly directive loudspeaker positioned close to an individual passenger/user can bring an effective solution for medium and high frequencies. However, it is generally impractical in most situations to make a loudspeaker directive at bass frequencies, since in order to provide a highly directive loudspeaker for bass frequencies, the dimensions of the radiating surface must be of the same order as the wavelength, and wavelengths are typically very long for bass frequency content (e.g. $\lambda$=3.4 m for f=100 Hz). Loudspeakers with radiating surfaces of this scale for producing bass frequency content are impractical in many situations, such as in a car. Nonetheless, bass frequency content is a very important part of the audio spectrum and in most music this spectrum represents half or more of the total sound power.

It is known from WO2019/121266A1 that dipole loudspeakers can provide an effective personal sound cocoon at bass frequencies, thereby effectively providing a personal subwoofer. In particular, WO2019/121266A1 explains how sound produced by a first radiating surface of a diaphragm of such a dipole loudspeaker interferes with the sound produced by a second radiating surface of the diaphragm, and this interference results in beneficial effects that may help to create a personal sound cocoon at bass frequencies. In particular, for a suitably dimensioned diaphragm, from a listening position that is 40 cm or less from the first radiating surface of such a loudspeaker (e.g. measured along a principal radiating axis of the first radiating surface), a user can experience bass sound that is highly localised, in the sense that the sound pressure level (SPL) experienced by a user will quickly attenuate with increasing distance from the loudspeaker.

FIG. 10 and FIG. 17 of WO2019/121266A1 show example dipole loudspeakers in which a diaphragm is suspended from a drive unit frame via drive unit suspensions, and the drive unit frame is itself suspended from a mounting frame via mounting frame suspensions.

The present inventor has found that space inside a car headrest for integrating a bass dipole loudspeaker may be limited, due to design aspects, mechatronics, and the further inclusion of comfort elements and safety features, for example. The present inventor has thus found that providing a mounting frame suspension adjacent to, and around the periphery of, the diaphragm, as illustrated in FIG. 10 of WO2019/121266A1 can be an inefficient use of the space available inside the car headrest for obtaining a desired SPL at the listening position. The present inventor has also found that suspending a drive frame from mounting legs of a car headrest as shown in FIG. 17 of WO2019/121266A1 can result in the acoustic output being diminished due to sound interference from the first and second radiating surfaces of the diaphragm of the loudspeaker (caused by an acoustic output short circuit) inside the headrest, because the available space in a headrest is often presented as a “tunnel” in which the bass unit has to fit.

The present inventor has observed that the space available inside a car headrest for implementing a dipole loudspeaker for producing sound at bass frequencies, can be more effectively utilised, whilst preventing unwanted interference of sound produced by first and second radiating surface of the diaphragm inside the headrest, by providing a substantially continuously-extending second suspension element within the outer contour of the dipole loudspeaker.

The present invention has been devised in light of the above considerations.

SUMMARY OF THE INVENTION

A first aspect of the present invention may provide:

A dipole loudspeaker assembly for producing sound at bass frequencies, the dipole loudspeaker assembly comprising:

a dipole loudspeaker, including:

- a diaphragm having a first radiating surface and a second radiating surface, wherein the first radiating surface and the second radiating surface are located on opposite faces of the diaphragm;
- a drive unit configured to move the diaphragm along a movement axis at bass frequencies such that the first and second radiating surfaces produce sound at bass frequencies, wherein the sound produced by the first radiating surface is in antiphase with sound produced by the second radiating surface;

a drive unit frame, wherein the diaphragm is suspended from the drive unit frame via at least one drive unit suspension, wherein the drive unit frame is configured to, in use, allow sound produced by the first radiating surface to propagate out from a first side of the dipole loudspeaker and to allow sound produced by the second radiating surface to propagate out from a second side of the dipole loudspeaker; and a mounting frame, wherein the drive unit frame (of the dipole loudspeaker) is suspended from the mounting frame via one or more mounting frame suspensions;

wherein the/each mounting frame suspension, as projected onto a plane perpendicular to the movement axis, at least partially overlaps with one or more elements selected from the diaphragm and the at least one drive unit suspension as projected onto the same plane;

wherein at least one mounting frame suspension is formed in a gap between the drive unit frame and the mounting frame and extends substantially continuously around the drive unit frame.

By extending substantially continuously around the drive unit frame, the at least one mounting frame suspension is able to inhibit sound produced by the first radiating surface from reaching the second radiating surface via the gap, and the path length (distance the sound waves produced by the first radiating surface meets the antiphase sound waves produced by the second radiating surface) will increase since the sound waves are guided around the outer contours of the mounting frame (which may be a headrest, in some examples). Accordingly, unwanted interference of the sound produced by the first radiating surface with the antiphase sound produced by the second radiating surface can be reduced, and a higher sound pressure level (SPL) at a listening position in front of the first radiating surface can be achieved.

By having at least one mounting frame suspension formed in the gap between the drive unit frame and the mounting frame, it is possible to provide an effective baffle without necessarily increasing a maximum height of the dipole loudspeaker (e.g. the dimension of the dipole loudspeaker in a direction parallel to the movement axis).

By having the/each mounting frame suspension, as projected onto a plane perpendicular to the movement axis, at least partially overlap one or more elements selected from the diaphragm and the at least one drive unit suspension as projected onto the same plane, the effective radiating surface area of the diaphragm can be increased within a given space, e.g. within a mounting frame for accommodating a loudspeaker which may be part of the chassis of a headrest, e.g. in a car.

Moreover, by having the mounting frame suspension extend substantially continuously around the drive unit frame, the mounting frame suspension is able to reduce lateral rocking of the diaphragm/drive unit frame in any direction other than parallel to the movement axis, compared e.g. with a configuration as shown in FIG. 17 of WO2019/121266A1.

For avoidance of any doubt, the/each mounting frame suspension may, as projected onto a plane perpendicular to the movement axis, at least partially overlap with the diaphragm only, one or more drive unit suspensions only, or both the diaphragm and one or more drive unit suspensions, as projected onto the same plane. If there are two or more drive unit suspensions, the/each mounting frame suspension may at least partially overlap with one of the drive unit suspensions, or with multiple (e.g. all) drive unit suspensions. If there are two mounting frame suspensions, each mounting frame suspension may at least partially overlap with the same one or more elements, or different one or more elements, selected from the diaphragm and the at least one drive unit suspension as projected onto the same plane.

Preferably, the phrase "extends substantially continuously around the drive unit frame" is intended to mean that the/each mounting frame suspension extends around the drive unit frame with no, few or small interruptions/discontinuities, preferably such that sound produced by the first radiating surface is inhibited, more preferably significantly inhibited, from reaching the second radiating surface via the gap. For example, large interruptions/discontinuities in a mounting frame suspension may mean that the mounting frame suspension provides virtually no inhibiting effect on sound produced by the first radiating surface from reaching the second radiating surface via the gap, whereas small or few discontinuities may still allow for a significant inhibiting effect to be provided.

The substantially continuously-extending mounting frame suspension(s) may thus provide a baffle configured to inhibit sound produced by the first radiating surface from reaching the second radiating surface via the gap.

The dipole loudspeaker assembly may be for use (e.g. configured to be used) with an ear of a user being located at a listening position (preferably each ear of a user being located at a respective listening position) that is in front of the first radiating surface and is 50 cm or less (more preferably 40 cm or less, more preferably 30 cm or less, more preferably 25 cm or less, more preferably 20 cm or less, more preferably 15 cm or less) from the first radiating surface. The terms "user" and "listener" may be used interchangeably in this disclosure.

The present inventor has observed that, at such a listening position(s), increasing the effective radiating surface area of the diaphragm results in an improved SPL for the user.

Here it is to be noted that although the(/each) listening position has been defined with respect to the front of the first radiating surface, this does not rule out the possibility of a similar effect being achievable in front of the second radiating surface. Indeed, it is expected that a similar effect could be achieved in front of the second radiating surface.

The dipole loudspeaker assembly may be configured (e.g. by appropriately arranging and sizing the diaphragm, drive unit suspension(s) and mounting frame) such that the SPL of sound produced by the dipole loudspeaker at a bass frequency of 60 Hz as measured at 80 cm from the first radiating surface along a principal radiating axis of the first radiating surface is at least 30 dB (more preferably at least 25 dB) lower than the SPL of the same sound as measured at 10 cm from the first radiating surface along the principal radiating axis of the first radiating surface in a free field condition.

Herein, a free field condition may be understood as anechoic conditions, e.g. as might be measured in an anechoic chamber.

Herein, a principal radiating axis of a radiating surface may be understood as an axis along which the radiating surface produces direct sound at maximum amplitude (sound pressure level). Typically, the principal radiating axis will extend outwardly from a central location on the radiating surface. The principal radiating axes of the first and second radiating surfaces will in general extend in opposite directions, since they are located on opposite faces of the diaphragm.

The bass frequencies at which the drive unit is configured to move the diaphragm preferably include frequencies across the range 60-80 Hz, more preferably frequencies across the range 50-100 Hz, more preferably frequencies across the range 40-100 Hz, and may include frequencies across the range 40-160 Hz. The drive unit may be configured to move the diaphragm at frequencies that do not exceed 250 Hz, 200 Hz, or even 160 Hz, in order to ensure the loudspeaker achieves a desired level of "cocooning", as described in WO2019/121266A1.

Moving the diaphragm at frequencies below 40 Hz may be useful for some applications, but not for others (such as in a car, where below 40 Hz background noise tends to be too loud).

The dipole loudspeaker may thus be (configured as) a subwoofer. A subwoofer can be understood as a loudspeaker dedicated to (rather than suitable for) producing sound at bass frequencies.

The present inventor has found that the gap between the drive unit frame and the mounting frame is preferably minimized in order to maximise the effective radiating surface area of the diaphragm. A gap of some extent is required in order to allow the drive unit to move the diaphragm along the movement axis at bass frequencies, whilst having the drive unit frame suspended from the mounting frame by the at least one mounting frame suspension.

Accordingly, in some examples, a gap between the drive unit frame and the mounting frame, as measured in a plane perpendicular to the movement axis, may be 5 mm or less (more preferably, 4 mm or less, more preferably 3 mm or less, more preferably 2 mm or less, in some cases even 1 mm or less) at one or more locations at a periphery of the drive unit frame.

In some examples, a gap between the drive unit frame and the mounting frame, as measured in a plane perpendicular to the movement axis, may be 5 mm or less, more preferably 3 mm or less, more preferably 2 mm or less, in some cases even 1 mm or less, for at least 50% (more preferably at least 80%, more preferably at least 90%, more preferably at least 95%) of a path which extends around the drive unit frame at a periphery of the drive unit frame).

In some examples, a gap between the drive unit frame and the mounting frame, as measured in a plane perpendicular to the movement axis, may be 5 mm or less, more preferably 3 mm or less, more preferably 2 mm or less, in some cases even 1 mm or less, for substantially the entirety of a path which extends around the drive unit frame at a periphery of the drive unit frame. However, larger gaps may be required at certain regions of a periphery of the drive unit frame, particularly where the mounting frame and/or diaphragm has a non-circular shape (such as diaphragms having an oval or race-track shape, for example).

In some examples, the first and second radiating surfaces of the diaphragm may have a circular shape.

In other examples, the first and second radiating surfaces of the diaphragm may have a non-circular shape, e.g. an oval, rectangular, square, rounded rectangular or race-track shape. This may help to maximize the effective radiating surface area of the diaphragm within other design constraints (e.g. incorporating the loudspeaker into a car headrest).

The present inventor has found that the dimension and shape of the mounting frame may vary depending on the shape and size of the space available, e.g. space available in the headrest, in which the loudspeaker is to be mounted. The shape of the diaphragm (and in particular the first and second radiating surfaces of the diaphragm) may therefore be chosen to closely match the shape of the space provided by the mounting frame, e.g. so that the gap between the mounting frame and the drive unit frame is minimised along a path which extends around the drive unit frame at a periphery of the drive unit frame.

The dipole loudspeaker assembly may include multiple dipole loudspeakers, wherein a drive unit frame of each loudspeaker is suspended from the mounting frame via one or more mounting frame suspensions.

Each dipole loudspeaker may have features according to the definition of a dipole loudspeaker provided herein. For example, each dipole loudspeaker may include:

a diaphragm having a first radiating surface and a second radiating surface, wherein the first radiating surface and the second radiating surface are located on opposite faces of the diaphragm;

a drive unit configured to move the diaphragm along a movement axis at bass frequencies such that the first and second radiating surfaces produce sound at bass frequencies, wherein the sound produced by the first radiating surface is in antiphase with sound produced by the second radiating surface;

a drive unit frame, wherein the diaphragm is suspended from the drive unit frame via at least one drive unit suspension, wherein the drive unit frame is configured to, in use, allow sound produced by the first radiating surface to propagate out from a first side of the dipole loudspeaker and to allow sound produced by the second radiating surface to propagate out from a second side of the dipole loudspeaker.

The effective radiating area of the first radiating surface (or the combined effective radiating areas of the first radiating surfaces, if there is more than one dipole loudspeaker included in the dipole loudspeaker assembly) may be 60 $cm^2$ or more, more preferably 80 $cm^2$ or more, more preferably 100 $cm^2$ or more. For reasons that can be understood from WO2019/121266A1, an effective radiating area in this range can provide an effective personal sound cocoon at bass frequencies.

As is known in the art, for a diaphragm having a circular perimeter which is suspended from a loudspeaker support structure by a roll suspension having an outer diameter $d_o$ and an inner diameter $d_i$ (e.g. such as the diaphragms shown in FIGS. 1*a*-1*c*), the effective radiating surface area of the diaphragm may be estimated as $$S_D = \pi\left(\frac{d}{2}\right)^2,$$

where d is the half-diameter of the roll suspension, $(d_o+d_i)/2$.

Alternatively, or for more complex diaphragm geometries, the effective radiating area of the diaphragm $S_D$ may be measured using known techniques, see e.g. "Dynamical Measurement of the Effective Radiating area SD", Klippel GmbH (https://www.klippel.de/fileadmin/klippel/Files/Know_How/Application_Notes/AN_32_Effective_Radiation_Area.pdf).

To avoid complex calculations regarding effective radiating area, the surface area of the first radiating surface (or the combined surface area of the first radiating surfaces, if there is more than one dipole loudspeaker included in the dipole loudspeaker assembly) may be 50 $cm^2$ or more, 60 $cm^2$ or more, more preferably 80 $cm^2$ or more, more preferably 90 $cm^2$ or more. With surface areas in these ranges, an effective personal sound cocoon at bass frequencies can be achieved for reasons that can be understood from WO2019/121266A1 (noting that the effective radiating area is generally only a few % larger than the actual surface area).

The diaphragm may take various forms.

For example, the diaphragm could be of paper, or another sheet material.

For example, the diaphragm may be a single (monolithic) piece of material. Such a material is preferably light-weight, e.g. having a density of 0.1 g/$cm^3$ or less. The material may be extruded polystyrene or similar. In some examples, the diaphragm may be covered by a skin, e.g. to protect the diaphragm. The skin could be of paper, carbon fibre, plastic foil, for example.

For example, the diaphragm may include several pieces of material attached together, e.g. by glue. For example, the diaphragm may include a first cone and a second cone, wherein the first and second cone are glued back to back. The first and second cones may e.g. be made of paper.

The diaphragm may comprise one or more (e.g. a pattern of) folds (most appropriate if the diaphragm is of a sheet material, such as paper). This may help to reduce the height of the dipole loudspeaker (e.g. in a direction parallel to the movement axis), whilst still maintaining a stable dipole loudspeaker. The/each fold may, when viewed in a circumferential direction, radially extend between an inner circumferential edge and an outer circumferential edge of the diaphragm. The/each fold may have a depth which increases from the outer circumferential edge, and the inner circumferential edge, of the diaphragm towards a base region positioned between (e.g. approximately mid-way between) the outer circumferential edge and the inner circumferential edge of the diaphragm. Accordingly, a maximum depth of the/each fold may be located at the base region. The/each fold may be provided with a respective face in the base region. Examples of possible patterns of folds are described in WO2005/015950A1.

The at least one drive unit suspension may include a roll suspension. The roll suspension may interconnect the drive unit frame and an outer circumferential edge of the diaphragm.

The at least one drive unit suspension may include a spider. The spider may be secured at its inner rim to the drive unit frame, and at its outer rim to the diaphragm. Alternatively, the spider may be secured at its outer rim to the drive unit frame, and at its inner rim to the diaphragm. A spider may be understood as a textile ring having circumferentially extending corrugations. A spider may facilitate movement of the diaphragm along the movement axis whilst inhibiting, preferably substantially preventing, movement of the diaphragm perpendicular to the movement axis.

If the diaphragm comprises one or more folds (see above), the spider may be secured at its inner rim to the drive unit frame, and at its outer rim to the faces of the folds at the base regions of the diaphragm, preferably by an adhesive such as glue. Alternatively, the spider may be secured at its outer rim to the drive unit frame, and at its inner rim to the faces of the folds at the base regions of the diaphragm, preferably by an adhesive such as glue. Optionally, the diaphragm may be suspended from the drive unit frame by a plurality of spiders.

If the diaphragm comprises one or more folds (see above), the dipole loudspeaker may include a stiffening element which extends around a magnet unit of the drive unit and stiffens the diaphragm at the base region(s) of the diaphragm, so as to reinforce the diaphragm against deformation in the base region(s). The stiffening element may be circular, and may, when viewed in cross-section, include a corrugation to stiffen the base region. The stiffening element may be made from a material selected from paper, aluminium, titanium, polypropylene, polycarbonate, acrylonitrile butadiene styrene or Kevlar™, for example. The stiffening element may be attached (directly) to the mid-region of the diaphragm, or indirectly via the spider, preferably by an adhesive. Examples of possible stiffening elements are described in WO2008/135857A1.

The at least one mounting frame suspension may be configured to have a resonant frequency that is below the frequency spectrum over which the dipole loudspeaker is configured to operate (e.g. below 40 Hz), e.g. so as to limit the force on a supporting structure (e.g. the mounting frame). However, the resonant frequency of the at least one mounting frame suspension is preferably not below 10 Hz, since the at least one mounting frame suspension having resonant frequency below 10 Hz can cause problems with static deflection ("Xstat") as discussed below.

References herein to a "resonant frequency" of the at least one mounting frame suspension refer to a frequency at which, in use, the mass suspended from the mounting frame by the at least one mounting frame suspension is caused to resonate.

Accordingly, the at least one mounting frame suspension may be configured to have a resonant frequency that is between 10 Hz and 30 Hz (inclusive), more preferably between 10 Hz and 20 Hz (inclusive).

The at least one mounting frame suspension may be configured such that the static deflection of the at least one mounting frame suspension, at an angle $\alpha$ of 90°, is 2.5 mm or less, more preferably 1.5 mm or less. The at least one mounting frame suspension may be configured such that the static deflection of the at least one mounting frame suspension, at an angle $\alpha$ of 90°, is 0.5 mm or higher.

Herein, a is an angle between a plane perpendicular to the principal radiating axis and a vertical direction, and "static deflection" of the at least one mounting frame suspension is the distance by which the mass suspended from the mounting frame by the at least one mounting frame suspension deviates from a rest position, where the rest position is defined as the position of the mass at $\alpha$=0°.

If there is only a single mounting frame suspension, the single mounting frame suspension may be configured to be positioned on a centre of gravity plane when the diaphragm is at rest.

Herein, a centre of gravity plane is defined as a plane perpendicular to the movement axis that contains a centre of mass of the dipole loudspeaker (defined as MI below).

The drive unit frame may be suspended from the mounting frame via at least two mounting frame suspensions, wherein the at least two mounting frame suspensions are separated in a direction parallel to the movement axis.

Providing at least two mounting frame suspensions in this manner, each extending substantially continuously around the drive unit frame, may improve the stability of the dipole loudspeaker.

Where there are two mounting frame suspensions separated in a direction parallel to the movement axis, each mounting frame suspension may be configured to be positioned on opposing sides of (preferably also at an equal distance from, in a direction parallel to the movement axis) a centre of gravity plane when the diaphragm is at rest.

The drive unit frame may be integral (i.e. integrally formed) with one or more mounting frame suspensions. In other words, the drive unit frame and one or more mounting frame suspensions may be formed as a single piece.

Alternatively, one or more mounting frame suspensions may be configured to attach to the drive unit frame, e.g. by one or more snap-fit connections, by adhesive, such as glue beads, self-adhesive strips and/or by friction fit. For example, the drive unit frame and one or more mounting frame suspensions may have corresponding and interlocking snap-fit elements for snap fitting the drive unit frame to one or more mounting frame suspensions.

The drive unit frame may be provided in one or more pieces, which are configured to attach (e.g. snap-fit) together to form the drive unit frame. For example, the drive unit frame may include one or more supplementary frames which are configured to attach (e.g. snap-fit) to one or more other pieces of the drive unit frame so as to form the drive unit frame. The one or more supplementary frames of the drive unit may be configured to separate two mounting frame suspensions, e.g. two roll suspensions (see below), in a direction parallel to the movement axis. The one or more supplementary frames of the drive unit may be attached to the two mounting frame suspensions, e.g. by adhesive, such as glue beads, self-adhesive strips and/or by friction fit.

The mounting frame may be integral (e.g. integrally formed) with one or more mounting frame suspensions. In other words, the mounting frame and one or more mounting frame suspensions may be formed as a single piece.

Alternatively, one or more mounting frame suspensions may be configured to attach to the mounting frame, e.g. by one or more snap-fit connections, by adhesive, such as glue beads, self-adhesive strips and/or by friction fit. For example, the mounting frame and one or more mounting frame suspensions may have corresponding and interlocking snap-fit elements for snap-fitting the mounting frame to one or more mounting frame suspensions. This may be applicable, for example, to a mounting frame suspension that is a block of elastic material (see below).

The mounting frame may be provided in one or more pieces, which are configured to attach (e.g. snap-fit) together to form the mounting frame.

For example, the mounting frame may include one or more supplementary frames (as described below) which are configured to attach (e.g. snap-fit) to one or more other pieces of the mounting frame so as to form the mounting frame. The one or more supplementary frames of the mounting frame may be configured to separate two mounting frame suspensions, e.g. two roll suspensions (see below), in a direction parallel to the movement axis. The one or more supplementary frames of the mounting frame may be attached to the two mounting frame suspensions, e.g. by adhesive, such as glue beads, self-adhesive strips and/or by friction fit.

In this way, the drive unit frame, and therefore the diaphragm, may be more easily assembled in the mounting frame.

Optionally, the drive unit frame may comprise one or more protruding flanges. These protruding flanges may aid manufacture, in particular to facilitate the adhesion of one or more mounting frame suspensions to the mounting frame.

The/each mounting frame suspension may comprise a roll suspension.

In some examples, there are two mounting frame suspensions, wherein each mounting frame suspension is a roll suspension. The two roll suspensions may be separated in a direction parallel to the movement axis by part of the mounting frame and/or part of the drive unit frame. In particular, the two roll suspensions may be separated in a direction parallel to the movement axis by one or more supplementary frames of the mounting frame and/or one or more supplementary frames of the drive unit frame. In particular, the two roll suspensions may be separated by a pair of supplementary frames, a first of the pair of supplementary frames being part of the mounting frame, and a second of the pair of the supplementary frames being part of the drive unit frame. Using two roll suspensions arranged in this manner helps to provide improved stability against rocking (e.g. in a direction other than parallel to the movement axis). Each roll suspension may comprise rubber, pressed or non-pressed foam, and/or textile, for example. Each roll suspension may comprise an elastic material or an inelastic material. Each roll suspension may extend substantially continuously around the drive unit frame.

Optionally, if there is more than one mounting frame suspension (e.g. two roll suspensions), one of the mounting frame suspensions may comprise one or more pressure equalization vents (e.g. one roll suspension may be perforated). Alternatively/additionally, the mounting frame and/or drive unit frame itself may comprise one or more pressure equalization vents. This may help to avoid build-up of pressure in a space between the two mounting frame suspensions.

In some examples, one or more mounting frame suspensions (optionally the/each mounting frame suspension) may comprise a piece of elastic material held taut between the mounting frame and the drive unit frame. The mounting frame and the drive unit frame may be configured to hold the/each piece of elastic material such that there is no or little slack in the piece(s) of elastic material, and such that the elastic material is not substantially stretched when the diaphragm is at rest. In particular, the/each mounting frame suspension may comprise a piece of elastic material held taut between the supplementary frames of the mounting frame and the drive unit frame, respectively. The/each piece of elastic material may comprise elastic foam or (silicone) rubber, for example.

The present inventor has observed that a roll suspension permits axial movement because of the excess material in the roll that can "roll off" during excursion. As such, a roll suspension need not be elastic. In contrast, when the/each mounting frame suspension comprises one or more taut pieces of elastic material held between the mounting frame and the drive unit frame (e.g. so that there is no excess material, or slack), elasticity is required in order to provide the compliance of the suspension. It is understood that this elasticity might also prevent rocking of the drive unit frame and diaphragm (e.g. in a direction other than parallel to the movement axis), as such rocking would work against the elastic bias of the material. Accordingly, only a single taut piece of elastic material might be necessary to adequately reduce rocking.

Preferably, the mounting frame and the drive unit frame (e.g. a supplementary frame of the mounting frame and a supplementary frame of the drive unit plane) overlap when projected onto a plane perpendicular to the movement axis, such that the mounting frame serves to prevent the drive unit frame (and in particular a magnet unit attached thereto) from being ejected out from the mounting frame in a crash event or another event that involves a sudden decelerations of the loudspeaker. The overlapping portions of the mounting frame and drive unit frame are preferably rigid.

In some examples, one or more mounting frame suspensions (optionally the/each mounting frame suspension) may comprise a block of elastic material. The block may be a foam block, e.g. a non-pressed elastic foam block. The elastic block may be solid or hollow. It may include one or more corrugations and/or cavities which may help to increase the stability of the/each block acting as a mounting frame suspension.

For avoidance of any doubt, if the loudspeaker comprises a plurality of mounting frame suspensions, each of the mounting frame suspensions may be a same type of mounting frame suspension as described above. Alternatively each, or some, or the mounting frame suspensions may be a different type of mounting frame suspension as described above.

In the context of this disclosure, the term "drive unit frame" is intended to encompass any substantially rigid structure from which a diaphragm can be suspended.

In the context of this disclosure, the term "mounting frame" is intended to encompass any substantially rigid structure from which a drive unit frame of a loudspeaker can be suspended.

The mounting frame may define a waveguide which at least partially (preferably entirely) surrounds the diaphragm and is configured to guide sound produced by the first and/or second radiating surface of the diaphragm out of opposite sides of the mounting frame. The waveguide may optionally be formed (partly, or entirely) of foam. The waveguide may be located in a headrest of a seat, if the loudspeaker assembly is a seat assembly (see below).

The drive unit may be an electromagnetic drive unit that includes a magnet unit configured to produce a magnetic field, and a voice coil attached to the diaphragm (e.g. via a voice coil coupler). The magnet unit may be rigidly attached to the drive unit frame. In use, the voice coil may be energized (have a current passed through it) to produce a magnetic field which interacts with the magnetic field produced by the magnet unit and which causes the voice coil (and therefore the diaphragm) to move relative to the magnet unit. The magnet unit may include a permanent magnet. The magnet unit may additionally include a magnetic yoke, e.g. a U-yoke, and a steel washer (or steel top-plate). The magnet unit may be configured to provide an air gap, and may be configured to provide a magnetic field in the air gap. In particular, the air gap may be provided between the permanent magnet located radially inwards of the air gap with respect to a direction parallel to the movement axis, and the magnetic yoke located radially outwards of the air gap with respect to a direction parallel to the movement axis. The voice coil may be configured to sit in the air gap when the diaphragm is at rest. Such drive units are well known.

In this disclosure, a voice coil can be understood as a coiled length of wire that is attached to the diaphragm. The voice coil may be considered to be distinct from any of the (typically non-coiled) electrical connections (e.g. wires) used to supply electrical energy to the voice coil.

The magnet unit may be located in front of the second radiating surface of the diaphragm. The loudspeaker may include a safety element which is located between the magnet unit and the second radiating surface of the diaphragm. The safety element may be configured to prevent the magnet unit from passing through the diaphragm, e.g. in a crash event or another event that involves a sudden deceleration of the loudspeaker (e.g. where the loudspeaker has been moving in the direction of the principal radiating axis of the first radiating surface). The safety element is preferably rigid. The safety element may also serve as a voice coil coupler as described below.

Such a safety element may be particularly useful if the loudspeaker is mounted in a headrest of a vehicle seat, since it may help to provide protection for a person sat in such a seat in the event of a vehicle crash.

The loudspeaker may include a voice coil coupler attached to the diaphragm, preferably to the second radiating surface of the diaphragm, optionally at an inner circumferential edge of the diaphragm. The voice coil coupler may comprise a tubular element. The voice coil may be attached to the diaphragm by being wrapped around a tubular element of the voice coil coupler. The voice coil coupler may also serve as a safety element, as described above.

The voice coil coupler may comprise ribs which extend radially outwardly from a tubular element of the voice coil coupler through slots in the magnetic yoke (thus the magnetic yoke may be referred to as a slotted magnetic yoke). This allows the loudspeaker to have a small total height.

Preferably, the ribs of the voice coil coupler extend into an interior of the diaphragm. This may help to reinforce the diaphragm, particularly where the diaphragm has a thickness (in the direction of the movement axis) of 15 mm or less, or 10 mm or less, since at such thicknesses there may be a greater need for reinforcement of the diaphragm, particularly if the diaphragm is formed of a lightweight material such as an extruded or expanded foam e.g. of polypropylene (PP), polyurethane (PU) or polystyrene (PS).

The diaphragm may have a thickness of 5 mm or more. A thickness of 5 mm or more may be needed, if the diaphragm is formed of a lightweight material such as an extruded or expanded foam e.g. of polypropylene (PP), polyurethane (PU) or polystyrene (PS).

Preferably the ribs which extend into the body of the diaphragm are plates. The ribs are preferably made of a stiff, lightweight material. The ribs are preferably made of non-conductive (not electrically conductive) material, e.g. balsawood, so as to avoid interfering with the magnet unit and to prevent heat transfer from the voice coil to the diaphragm (in particular where the diaphragm is formed of a lightweight material such as an extruded or expanded foam, because the voice coil can become hot during operation and these foam materials are generally unable to withstand a lot of heat).

The slots may extend in a direction parallel to the movement axis. There may be three or more ribs and three or more slits, e.g. where each rib extends through a respective slit.

Each rib may extend into an interior of the diaphragm. This may be particularly appropriate if the diaphragm is a solid block of (preferably lightweight) material such as a foam, e.g. of polypropylene (PP), polyurethane (PU) or polystyrene (PS).

In this way, a lightweight foam diaphragm, which may itself be flimsy, may be reinforced and strengthened.

Each rib may be a stiff, rigid, lightweight and non-conductive rib. Each rib may be a plate. Each rib may comprise balsa wood, for example.

Optionally, the permanent magnet and the magnetic yoke are configured such that the magnetic flux density in the air gap reaches a first local maximum peak location along a direction parallel to the movement axis and a second local maximum peak location along a direction parallel to the movement axis, wherein the first peak and the second peak location are separated spatially in a direction parallel to the movement axis by a valley region in which the magnetic flux density is lower than both the first local maximum and the second local maximum, wherein the voice coil is configured to be positioned in the valley region when the diaphragm is at rest. This may allow for a large real application excursion whilst using a magnet unit with a small height.

To achieve such a magnetic flux density, the steel washer (or steel top-plate) of the magnet unit may comprise a recess (e.g. a cut out) at a location along a direction parallel to the movement axis adjacent, e.g. near to the position of, the voice coil when the diaphragm is at rest. The cut out may accommodate a shorting ring (e.g. an electrically conducting ring configured to dissipate eddy currents). The shorting ring may comprise copper, for example. Examples are provided in PCT/EP2020/064577.

The loudspeaker may include a flexible dustcap. The flexible dustcap may be attached to a tubular voice coil coupler. The dustcap may also be attached to the diaphragm. An example flexible dustcap is discussed in WO2019/121072.

A dipole loudspeaker according to the first aspect of the invention may find utility in any application where it might be desirable to provide a personal sound cocoon.

In some examples, the dipole loudspeaker assembly may be a dipole loudspeaker module configured to be mounted in a headrest of a seat.

The dipole loudspeaker module preferably includes one or more attachment formations on the mounting frame, wherein the attachment formations are configured to attach the mounting frame to a headrest of a seat (preferably a rigid structure of the headrest, e.g. a support foam region of a car headrest, a rigid frame of the headrest, or a combination of a support foam region and a rigid frame of the headrest), thereby mounting the dipole loudspeaker module in a headrest of the seat.

The dipole loudspeaker module may include a first protective grille positioned in front of the first radiating surface of the diaphragm. The first protective grille may, for example, be attached to or form part of the mounting frame.

The first protective grille may help to protect the dipole loudspeaker, e.g. as described in more detail below with reference to FIG. 11G.

The first protective grille may be shaped to follow contours of a surrounding region of a headrest, e.g. a surrounding foam region of the headrest, when the dipole loudspeaker module is mounted in the headrest.

The first protective grille may be configured to be covered with an open cell foam, to provide a desired headrest shape, when the first protective grille is covered with (preferably uniform thickness of) an open cell foam. If the dipole loudspeaker module is mounted in the headrest of the seat (see below), and the first protective grille is shaped to follow contours of a surrounding region of a headrest (see above), the first protective grille and at least part of the surrounding region of the headrest may be covered by a uniform thickness of an open cell foam. The contours of the first protective grill and the surrounding region of the headrest may be mutually shaped so that a desired headrest shape is achieved when the first protective grill and at least part of the surrounding region of the headrest are covered in a uniform thickness of an open cell foam.

The dipole loudspeaker module may include a second protective grille positioned in front of the second radiating surface of the diaphragm. The second protective grille may, for example, be attached to or form part of the mounting frame.

The second protective grille may help to protect the dipole loudspeaker, e.g. as described in more detail below with reference to FIG. 11G.

The second protective grille may be shaped to follow contours of a surrounding region of a headrest, e.g. a surrounding foam region of the headrest, when the dipole loudspeaker module is mounted in the headrest.

The second protective grille may be configured to be covered with an open cell foam, to provide a desired headrest shape, when the first protective grille is covered with (preferably uniform thickness of) an open cell foam. If the dipole loudspeaker module is mounted in the headrest of the seat (see below), and the second protective grille is shaped to follow contours of a surrounding region of a headrest (see above), the second protective grille and at least part of the surrounding region of the headrest may be covered by a uniform thickness of an open cell foam. The contours of the second protective grill and the surrounding region of the headrest may be mutually shaped so that a desired headrest shape is achieved when the second protective grill and at least part of the surrounding region of the headrest are covered in a uniform thickness of an open cell foam.

In a second aspect, there may be provided a seat assembly that comprises:

- a seat for seating a user; and
- a dipole loudspeaker assembly according to the first aspect.

Preferably, the dipole loudspeaker is mounted in a headrest of the seat.

In some examples, the dipole loudspeaker assembly may be mounted in a headrest of the seat. For example, the dipole loudspeaker assembly may be a dipole loudspeaker module (as described above) mounted in a headrest of the seat, In some examples, the entire seat assembly may serve as the dipole loudspeaker assembly, with the mounting frame of the loudspeaker being a rigid frame of the seat. In other words, the loudspeaker assembly may be a seat assembly including a seat for seating a user, wherein the mounting frame of the loudspeaker is a rigid frame of the seat.

For avoidance of any doubt, the rigid frame of the seat may include one or more support foam regions.

The seat may be configured to position a user who is sat down in the seat such that the at least one ear of the user is located at a listening position (preferably each ear of a user is located at a respective listening position) that is 40 cm or less (more preferably 30 cm or less, more preferably 25 cm or less, more preferably 20 cm or less, more preferably 15 cm or less) from the first radiating surface of the loudspeaker.

Preferably, the dipole loudspeaker is mounted within a headrest of the seat ("seat headrest"). Since a typical headrest is configured to be a small distance (e.g. 30 cm or less) from the ear(s) of a user who is sat down in a seat, this is a particularly convenient way of configuring the seat to position a user who is sat down in the seat such that an ear of the user is located at a listening position that is a small distance (e.g. 30 cm or less) from the first radiating surface of the loudspeaker. The headrest may be detachable from the remainder of the seat. For example, the headrest could include mounting pins which are part of the rigid frame of the seat, but are configured to allow the headrest to be detached from the remainder of the rigid frame of the seat (such mounting pins are common in most cars). Alternatively, the headrest may be integral with the remainder of the seat.

If there are more than one dipole loudspeakers included in the loudspeaker assembly (see above), then each dipole loudspeaker may be mounted within a headrest of the seat.

A seat headrest typically has a front surface configured to face towards the head of a user sat in the seat, and a back surface configured to face away from the head of a user sat in the seat. The dipole loudspeaker is preferably mounted within the headrest of the seat e.g. with the first radiating surface of the loudspeaker facing the front surface of the headrest, e.g. with a principal axis of the first radiating surface extending out through the front surface of the headrest.

The dipole loudspeaker may be mounted in the seat headrest so that the seat headrest is configured to allow sound produced by the first radiating surface of the diaphragm to propagate out through the front surface of the headrest and to allow sound produced by a second radiating surface of the acoustic radiator to propagate out from the back surface of the headrest. The seat headrest may include acoustically transparent regions (e.g. acoustically transparent foam) for this purpose.

A skilled person would appreciate that the extent to which the seat headrest is configured to allow sound produced by the first radiating surface of the diaphragm to propagate out through the front surface of the headrest and to allow sound produced by a second radiating surface of the diaphragm to propagate out from the back surface of the headrest will depend on a number of factors such as the level of person sound cocooning desired, the size of personal sound cocoon desired, and other design considerations (e.g. implementing the loudspeaker in a car headrest may require some of the frame or other structure to be located in front of the first and/or second radiating surfaces). Accordingly, the degree to which the seat headrest should be open to both the first and second radiating surfaces cannot readily be defined in a precise manner.

The seat assembly may include one or more additional loudspeakers, for example one or more, preferably two or more, directional mid-high frequency loudspeakers, e.g. operating over a frequency band that includes 300 Hz-3 kHz, more preferably 150 Hz-20 kHz. In particular, a headrest of the seat may include, in addition to the dipole loudspeaker (for producing bass frequencies), one or more, preferably two or more, directional mid-high frequency loudspeakers. The one or more directional mid-high frequency loudspeakers may be included in forward-protruding wings of the headrest. The one or more directional mid-high frequency loudspeakers may be of a cardioid types, e.g. as described in GB2004076.2, although other forms of directional loudspeaker are of course possible.

The seat may be a vehicle seat, for use in a vehicle such as a car ("car seat") or an aeroplane ("plane seat").

The seat could be a seat for use outside of a vehicle. For example, the seat could be a seat for a computer game player, a seat for use in studio monitoring or home entertainment.

In a third aspect, there may be provided a vehicle (e.g. a car or an aeroplane) having a plurality of seat assemblies as described in connection with the first aspect of the invention.

In a fourth aspect, there is provided a method of manufacturing the dipole loudspeaker assembly of the first aspect of the invention. The method may include snap fitting two or more elements of the loudspeaker assembly together, e.g. snap fitting one or more mounting frame suspensions to the drive unit frame, snap-fitting one or more mounting frame suspensions to the mounting frame, snap-fitting a supplementary frame (or other piece of the drive unit frame) to another piece of the drive unit frame, snap fitting a supplementary frame (or other piece of the mounting frame) to another piece of the mounting frame.

In a fifth aspect, there is provided a dipole loudspeaker according to the first aspect of the invention, wherein the drive unit frame of the dipole loudspeaker is configured to be suspended from a mounting frame via one or more mounting frame suspensions.

The dipole loudspeaker may include any feature described above in connection with the first aspect of the invention, without requiring the dipole loudspeaker to be actually suspended from the mounting frame via the one or more mounting frame suspensions.

The dipole loudspeaker may include one or more mounting frame suspensions (e.g. as defined in relation to the first aspect of the invention) for the purpose of suspending the drive unit frame (of the dipole loudspeaker) from a mounting frame via the one or more mounting frame suspensions.

The dipole loudspeaker may include a supplementary frame of a mounting frame suspension (e.g. as defined in relation to the first aspect of the invention) for the purpose of suspending the drive unit frame (of the dipole loudspeaker) from a mounting frame via the one or more mounting frame suspensions.

In a sixth aspect, there is provided a loudspeaker comprising:

- a diaphragm having a first radiating surface facing in a forward direction for producing sound to be radiated outwardly from the loudspeaker in the forward direction, and a second radiating surface facing in a backward direction, wherein the first radiating surface and the second radiating surface are located on opposite faces of the diaphragm;
- a drive unit configured to move the diaphragm along a movement axis, the drive unit comprising:
  - a magnet unit configured to provide a magnetic field in an air gap, wherein the air gap is located between a permanent magnet of the magnet unit located radially inwards of the air gap with respect to a direction parallel to the movement axis, and a magnetic yoke of the magnet unit located radially outwards of the air gap with respect to a direction parallel to the movement axis; and
  - a voice coil configured to sit in the air gap when the diaphragm is at rest;
- wherein the voice coil is attached to the diaphragm via a voice coil coupler, wherein the voice coil coupler includes ribs which extend radially outwardly from the voice coil coupler through slots in the magnetic yoke, and wherein the ribs extend into an interior of the diaphragm.

The loudspeaker of the sixth aspect may comprise any one or more of the features mentioned above with respect to any previous aspect of the invention, except where such a combination is clearly impermissible or expressly avoided.

For example, the diaphragm may have a thickness of (in the direction of the movement axis) of 15 mm or less, or 10 mm or less. The diaphragm may have a thickness of 5 mm or more.

For example, the diaphragm may be formed of a lightweight material such as an extruded or expanded foam e.g. of polypropylene (PP), polyurethane (PU) or polystyrene (PS).

For example, the ribs may be plates.

For example, the ribs are preferably made of non-conductive (not electrically conductive) material, e.g. balsawood, so as to avoid interfering with the magnet unit and to prevent heat transfer from the voice coil to the diaphragm (these foamed materials can't stand a lot of heat while a voice coil can become hot during operation).

For example, the loudspeaker may be a dipole loudspeaker for producing sound at bass frequencies, wherein the dipole loudspeaker is configured to, in use, allow sound produced by the first radiating surface to propagate out from a first side of the dipole loudspeaker and to allow sound produced by the second radiating surface to propagate out from a second side of the dipole loudspeaker.

For example, the loudspeaker may comprise a drive unit frame, wherein the diaphragm is suspended from the drive unit frame via at least one drive unit suspension. The magnet unit may be rigidly attached to the drive unit frame.

For example, the loudspeaker may be included in a loudspeaker assembly comprising a mounting frame, wherein the drive unit frame (of the loudspeaker) is suspended from the mounting frame via one or more mounting frame suspensions. The/each mounting frame suspension, as projected onto a plane perpendicular to the movement axis, may at least partially overlap with the diaphragm and/or the one or more drive unit suspensions as projected onto the same plane. At least one mounting frame suspension may be formed in a gap between the drive unit frame and the mounting frame and may extend substantially continuously around the drive unit frame.

Although the loudspeaker of the sixth aspect may be a dipole loudspeaker configured in accordance with the first aspect of the invention (e.g. as exemplified herein), a skilled person would recognise this need not be the case.

In particular, the loudspeaker of the sixth aspect need not be configured as a dipole loudspeaker. For example, the loudspeaker of the sixth aspect may include an enclosure configured to inhibit sound produced by the second radiating surface from propagating out from the loudspeaker, i.e. such that the loudspeaker acts as a conventional monopole loudspeaker.

The loudspeaker according to the sixth aspect need not be configured as a bass loudspeaker either, even though it is exemplified as such below.

The invention includes the combination of the aspects and preferred features described except where such a combination is clearly impermissible or expressly avoided.

SUMMARY OF THE FIGURES

Embodiments and experiments illustrating the principles of the invention will now be discussed with reference to the accompanying figures in which.

DETAILED DESCRIPTION OF THE INVENTION

Aspects and embodiments of the present invention will now be discussed with reference to the accompanying figures. Further aspects and embodiments will be apparent to those skilled in the art. All documents mentioned in this text are incorporated herein by reference.

Figure 1:
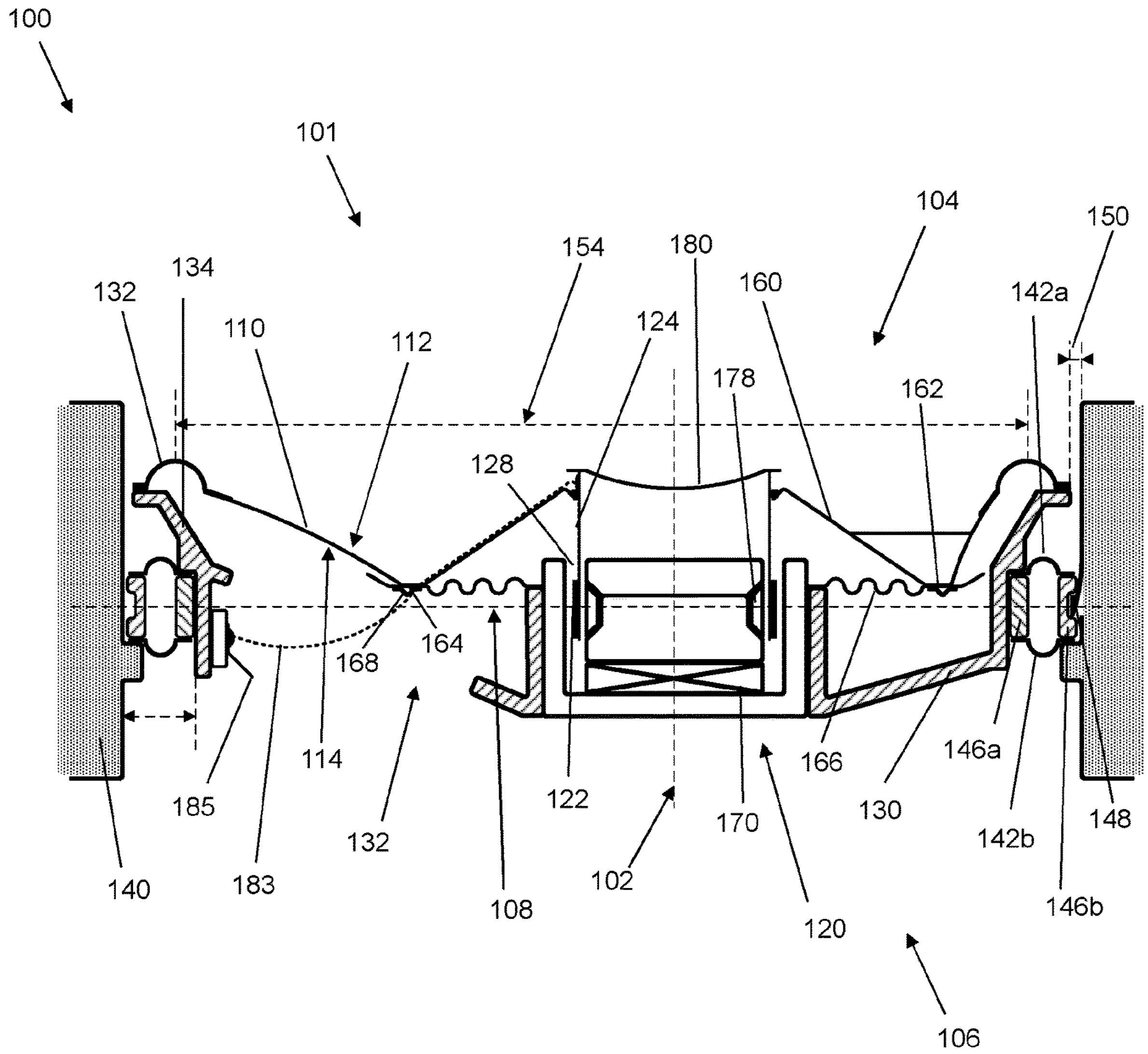
FIG. 1 shows a cross-section view of an example dipole loudspeaker assembly.

FIG. 1 is a cross-sectional view of a dipole loudspeaker assembly 100 for producing sound at bass frequencies. The dipole loudspeaker assembly 100 comprises a dipole loudspeaker 101 that includes diaphragm 110, a drive unit 120, a drive unit frame 130. The dipole loudspeaker assembly 100 also comprises a mounting frame 140, which is only partly shown in FIG. 1.

Figure 2A:
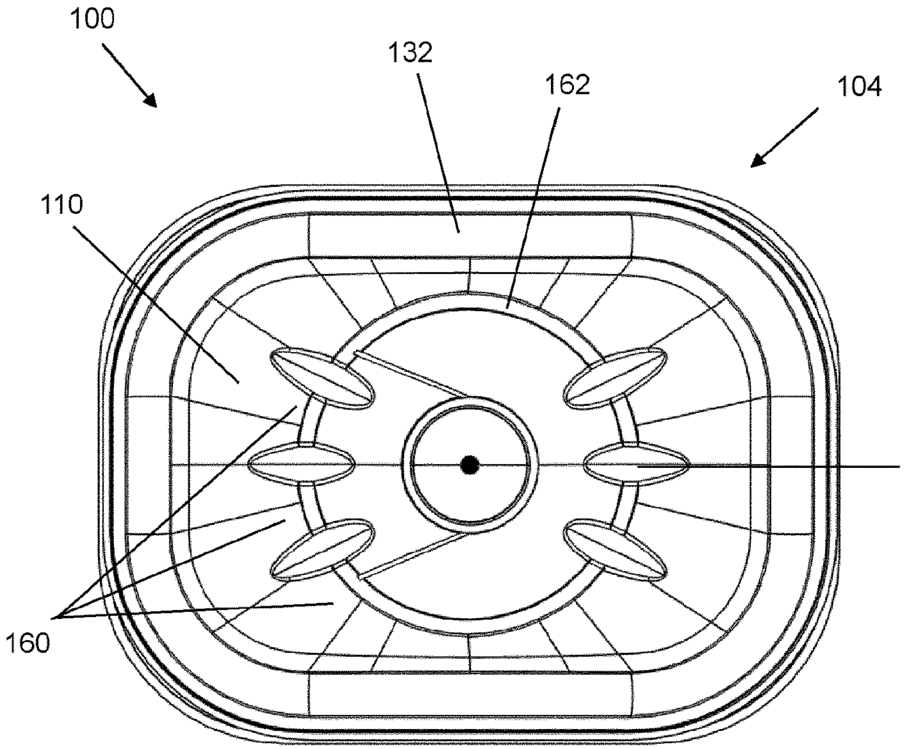
FIG. 2A shows a perspective view of the example dipole loudspeaker assembly of FIG. 1.
Figure 2B:
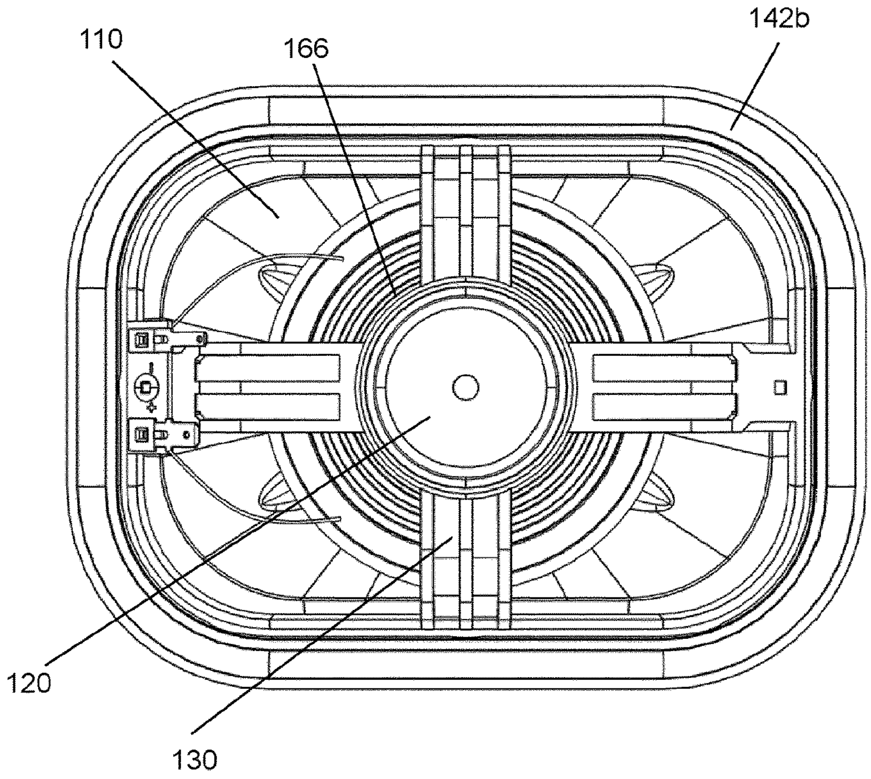
FIG. 2B shows another perspective view of the example dipole loudspeaker assembly of FIG. 1.

FIGS. 2A and 2B are perspective views of the dipole loudspeaker assembly 100 of FIG. 1. FIG. 2A shows a first side 104 of the dipole loudspeaker assembly 100, and FIG. 2B shows the opposite second side 106 of the dipole loudspeaker assembly 100.

Figure 2C:
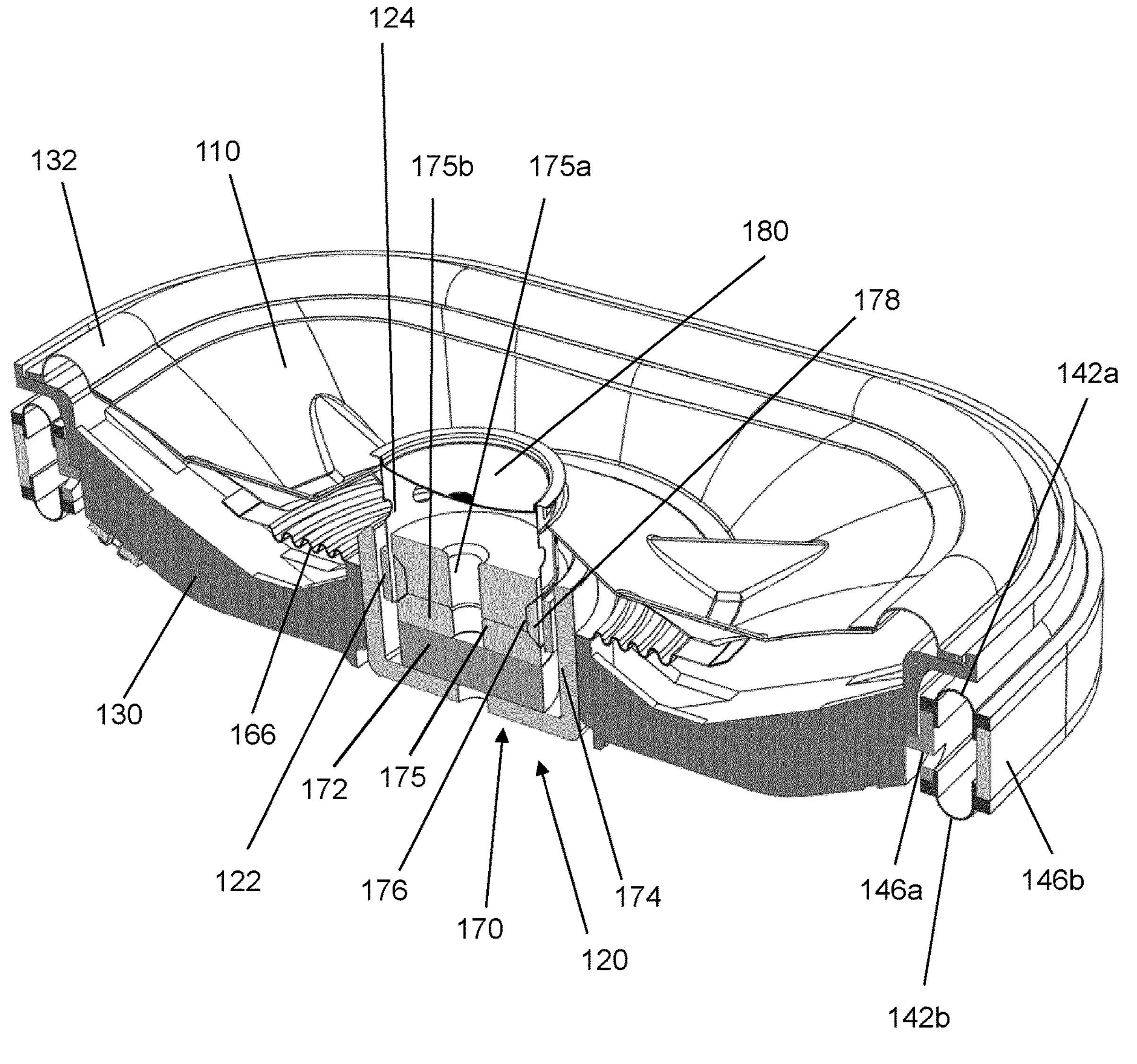
FIG. 2C shows another cross-section view of the example dipole loudspeaker assembly of FIG. 1.

FIG. 2C is a cross-sectional perspective view of the dipole loudspeaker assembly 100 of FIG. 1.

The mounting frame 140 is only partly shown in FIG. 2A-C (in the form of supplementary frame 146*b*, explained in more detail below).

The diaphragm 110 of the dipole loudspeaker 101 has a first radiating surface 112 and a second radiating surface 114, wherein the first radiating surface 112 and the second radiating surface 114 are located on opposite faces of the diaphragm 110.

The drive unit 120 is configured to move the diaphragm 110 along a movement axis 102 at bass frequencies such that the first and second radiating surfaces 112, 114 produce sound at bass frequencies. The sound produced by the first radiating surface 112 is in antiphase with sound produced by the second radiating surface 114.

In this example, the diaphragm 110 is suspended from the drive unit frame 130 via two drive unit suspensions 132, 166. In use, the dipole loudspeaker 100 is configured to allow sound produced by the first radiating surface 112 to propagate out from the first side 104 of the dipole loudspeaker and to allow sound produced by the second radiating surface 114 to propagate out from the second side 106 of the dipole loudspeaker 100 (e.g. via one or more gaps 132 in the drive unit frame 130).

In the example shown in FIG. 1, the diaphragm 110 is made of paper, and the two drive unit suspensions 132, 166 are a roll suspension 132 extending substantially continuously around the periphery of the diaphragm 110, and a spider 166, respectively.

The drive unit frame 130 is suspended from the mounting frame 140 via two mounting frame suspensions in the form of roll suspensions 142*a*, 142*b*. Both mounting frame suspensions 142*a*, 142*b* are (respectively) formed in a gap between the drive unit frame 130 and the mounting frame 140 and extend substantially continuously around the drive unit frame 130.

Both mounting frame suspensions 142*a*, 142*b*, as projected onto a plane 108 perpendicular to the movement axis 102, at least partially overlap with the roll suspension 132 as projected onto the same plane 108.

A first (radially inward) supplementary frame 146*a* of a pair of supplementary frames 146*a*, 146*b* forms a part of the drive unit frame 130 and is attached to a remainder of the drive unit frame 130 (e.g. by an adhesive). A second (radially outward) supplementary frame 146*b* of the pair of supplementary frames 146*a*, 146*b* forms a first part of the mounting frame 140 and is configured to attach to the remainder of the mounting frame 140 by one or more snap-fit connections 148.

The roll suspensions 142*a*, 142*b* are attached between the pair of supplementary frames 146*a*, 146*b* (e.g. by an adhesive).

The mounting frame suspensions 142*a*, 142*b* are configured to be positioned at an equal distance from a centre of gravity plane 108 in a direction parallel to the movement axis 102 on opposing sides of the centre of gravity plane when the diaphragm 110 is at rest.

The drive unit frame 130, mounting frame suspensions 142*a*, 142*b* and supplementary frames 146*a*, 146*b* may be pre-formed as a single unit, which can be snap-fitted to the remainder of the mounting frame 140. This may help to simplify the assembly of the loudspeaker assembly 100.

As shown in FIG. 1, a portion 134 of the drive unit frame 130 extends between a mounting frame suspension 142 and the drive unit suspension 132. This portion 134 of the drive unit frame 130 is substantially continuous (e.g. closed) in order to prevent sound interference from the first and second radiating surfaces 112, 114 of the diaphragm (e.g. to inhibit sound produced by the first radiating surface 112 from reaching the second radiating surface 114 via the gap between the drive unit frame 130 and a mounting frame suspension 142).

A gap 150 is provided between the drive unit frame 130 and the mounting frame 140 in order to allow free movement of the drive unit frame 130 within the mounting frame 140, e.g. to allow the drive unit 120 to move the diaphragm 110 along the movement axis 102, whilst having the drive unit frame 130 suspended from the mounting frame 140 by the mounting frame suspensions 142. However, the gap 150 is preferably minimized in order to maximise the drive unit frame dimensions within the mounting frame 140, and therefore the effective radiating surface area 154 of the first radiating surface 112 within the mounting frame 140. Accordingly, the gap 150 is preferably 3 mm or less, as measured in a plane perpendicular to the movement axis, at one or more locations (and preferably for substantially the entirety of a path which extends around the drive unit frame) at a periphery of the drive unit frame 130. The gap 150 is preferably 1 mm or more for substantially the entirety of a path which extends around the drive unit frame 130 at a periphery of the drive unit frame 130, in order to reduce the risk of the drive unit frame 130 touching the mounting frame 140 due to manufacturing tolerances.

The effective radiating surface area 154 of the first radiating surface 112 is preferably 60 $cm^2$ or more.

Ideally, a shape of the diaphragm 110 is chosen to closely match the shape of the space provided by the mounting frame 140. In this example, the diaphragm 110 has an oval or racetrack shape. This is shown in the cross-section view of FIG. 1, by the diaphragm 110 having different dimensions to the right and left of the drive unit 120, and in FIG. 2A.

However, the shape of the diaphragm may not completely correspond to the shape of the space provided by the mounting frame 140. As such, the gap 150 between the drive unit frame 130 and the mounting frame 140 may have a different size, as measured in a plane perpendicular to the movement axis, at different locations around the periphery of the drive unit frame 130.

The diaphragm 110 includes a pattern of folds 160 analogous to those described in WO2005/015950A1. When viewed in a circumferential direction, each fold has a depth that increases from an inner circumferential edge and an outer circumferential edge of the diaphragm 110, towards a base region 162 located between the outer-circumferential edge and the inner circumferential edge of the diaphragm 110.

The base regions 162 are positioned approximately midway between the outer-circumferential edge and the inner circumferential edge of the diaphragm 110. A maximum depth of each fold 160 is located at the base region 162 and the folds 160 are provided with faces 164 at the base region 162 (these faces are part of the second radiating surface 114), to which an outer rim of the spider 166 is attached.

A circular stiffening element 168 that includes a corrugation, analogous to that described in WO2008/135857A1 is attached to the spider 166 at the base region 162 and thus stiffens the diaphragm 110 at the base region(s) 162 of the diaphragm.

The spider 166 is secured (e.g. by an adhesive) at its inner rim to the drive unit frame 130, and at its outer rim to the faces 164 of the folds 160 at the base regions 162 of the diaphragm 110. The stiffening element 168 may be made from a material selected from paper, aluminium, titanium, polypropylene, polycarbonate, acrylonitrile butadiene styrene or Kevlar™, for example.

The mounting frame 140 is only partly shown in FIG. 2, and is a support foam region of a car headrest. The complete headrest is not shown in FIG. 2, but may be similar to that shown in FIG. 9, below.

As shown in FIG. 2C, the drive unit 120 is an electromagnetic drive unit including a magnet unit 170 and a voice coil 122. The voice coil 122 is attached to the inner circumferential edge of the diaphragm 110 by a tubular element 124 of a voice coil coupler. In particular the voice coil 122 is wrapped around the tubular element 124 and is configured to be energized by having a current passed through it via wires 183.

The wires 183 lead to at least one electrical connector 185 for receiving a cable (not shown) in order to connect the voice coil 122 to an audio source (not shown) via the cable and wires 183. Although only one connector 185 is shown in the drawing, in practice two connectors 185 may be present. In FIG. 1, the connector(s) 185 are shown as being attached to an inward-facing surface of the drive unit frame 134.

A dustcap 180 is attached to the tubular element 124 of the voice coil coupler.

The magnet unit 170 is located in front of the second radiating surface 114 of the diaphragm 110. The magnet unit 170 comprises a permanent magnet 172, a magnetic U-yoke 174 (preferably formed from steel) and a steel washer 175 (which comprises an upper part 175*a* and a lower part 175*b*). As shown in FIG. 1, the magnet unit 170 provides an air gap 128 in which the voice coil 122 is configured to sit when the diaphragm 110 is at rest. In particular, the air gap 128 is between the permanent magnet 172, the steel washer 175, and the magnetic U-yoke 174.

The steel washer 175 comprises a cut-out 176 (see e.g. FIG. 2C) at a location along a direction parallel to the movement axis 102, adjacent to the voice coil 122 when the diaphragm 110 is at rest. A shorting ring 178 is positioned in the cut-out 176. The shorting ring 178 may comprise copper, for example.

In use, the voice coil 122 may be energized (have a current passed through it) to produce a magnetic field that interacts with a magnetic field produced by the magnet unit 170 in the air gap 128, and which causes the voice coil 122 (and therefore the diaphragm 110) to move relative to the magnet unit 170.

The permanent magnet 172 and the magnetic U-yoke 174 are configured such that the magnetic flux density in the air gap 128 reaches a first local maximum peak location along a direction parallel to the movement axis 102 and a second local maximum peak location along a direction parallel to the movement axis 102. The first peak and the second peak location are separated spatially in a direction parallel to the movement axis 102 by a valley region in which the magnetic flux density is lower than both the first local maximum and the second local maximum. The 122 voice coil is configured to be positioned in the valley region when the diaphragm 110 is at rest. The shorting ring 178 described above may help to achieve such a magnetic flux density. Analogous examples are provided in PCT/EP2020/064577.

In use, the drive unit 120 may be configured to move the diaphragm 110 at bass frequencies across the range 40-100 Hz, for example. The mounting frame suspensions 142*a* and 142*b* are configured to have a resonant frequency that is between 10 Hz and 30 Hz. A theoretical explanation of how the at least one mounting frame suspension may be tuned to cause the at least one mounting frame to have such a resonant frequency is described in further detail below.

Because the mounting frame suspensions 142*a*, 142*b* extend substantially continuously around the drive unit frame 130, they inhibit sound produced by the first radiating surface 112 from reaching the second radiating surface 114 via the gap between the mounting frame 140 and the drive unit frame 130 in which the mounting frame suspensions 142*a*, 142*b* are formed. Accordingly, the sound produced by the first radiating surface 112 and the antiphase sound produced by the second radiating surface 114 is guided around the mounting frame (e.g. a headrest). Thus the interference will still take place, albeit at a greater distance from the diaphragm (increased pathlength provided by the headrest), as is desired for a personal sound cocoon.

Also, as the mounting frame suspensions 142*a*, 142*b* extend substantially continuously around the drive unit frame 130, the mounting frame suspensions 142*a*, 142*b* are able to reduce lateral rocking of the diaphragm 110/drive unit frame 130 in any direction other than parallel to the movement axis 102. Furthermore, as the mounting frame suspensions 142*a*, 142*b* are formed in the gap between the drive unit frame and the mounting frame, the mounting frame suspensions can act as a baffle without necessarily increasing the height of the dipole loudspeaker 100.

Further still, by having the mounting frame suspensions 142*a*, 142*b* at least partially overlap the roll suspension 132 as projected onto the same plane 108, the effective radiating surface area 154 of the diaphragm 110 can be increased within a given space, e.g. within a mounting frame 140 for accommodating a loudspeaker which may be part of the chassis of a headrest, e.g. in a car.

The mounting frame suspensions 142*a*, 142*b* and the supplementary frames 146*a*, 146*b* may be referred to as a mounting frame arrangement.

This mounting frame arrangement may optionally be provided as a composite part, for use in attaching the dipole loudspeaker 101 to (the remainder of the mounting frame) 140. The composite part may initially be formed as a separate component to (the remainder of) the drive unit frame 130 and/or (the remainder of) the mounting frame 140. Therefore, the composite part may be attachable to (the remainder of) the drive unit frame 130 and/or (the remainder of) the mounting frame 140. Such an attachment may be via one or more snap-fit connections or by any other connection means, e.g. by adhesive, glue beads self-adhesive strips and/or by friction fit.

Alternatively, one or more components of the mounting frame arrangement may be formed integrally with (the remainder of) the mounting frame and/or drive unit frame.

FIGS. 3A-H illustrate cross-sections of a number of examples of mounting frame suspension arrangements, which may be used as (or. instead of) the mounting frame suspension arrangement in the dipole loudspeaker 100 of FIG. 1.

Figure 3A:
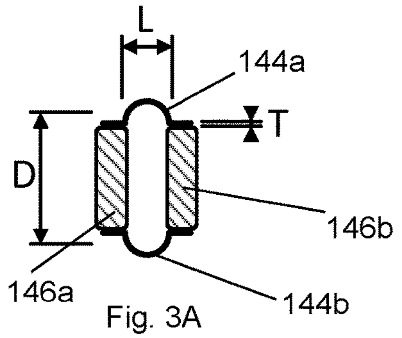
FIGS. 3A-3H show different example mounting frame suspension arrangements.

FIG. 3A shows an example mounting frame arrangement (optionally provided as a composite part) comprising two mounting frame suspensions. Each mounting frame suspension comprises a roll suspension 144*a*, 144*b*, and the roll suspensions 144*a*, 144*b* are separated by a distance D, by a pair of rigid supplementary frames 146*a*, 146*b*. As mentioned above, the rigid supplementary frame 146*a* is part of the drive unit frame 130 and the rigid supplementary frame 146*b* is part of the mounting frame 140. Distance D may be less than 30 mm, preferably less than 25 mm, preferably less than 20 mm, for example. Distance D is preferably more than 5 mm.

Separating the two roll suspensions 144*a*, 144*b* in the direction of the movement axis by distance D, which is preferably between 5 mm and 20 mm (inclusive), (in this case using the rigid supplementary frames 146*a*, 146*b*) helps to prevent the diaphragm 110/drive unit frame 130 from rocking, without necessarily increasing the height of the dipole loudspeaker.

The pair of roll suspensions 144*a*, 144*b* may comprise rubber, pressed or non-pressed foam, or textile etc. The choice of material, as well as the length L, thickness T, distance D and the shape of the roll suspension can be altered to define the total stiffness of the mounting frame suspensions. The desired total stiffness of the mounting frame suspensions 142*a*, 142*b* is discussed in further detail below.

In the example shown in FIG. 3A, the roll suspensions 144*a*, 144*b* bow away from each other.

Figure 3B:
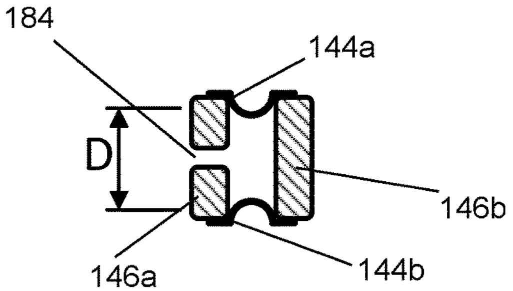

FIG. 3B shows an example mounting frame arrangement (optionally provided as a composite part) which is similar to the composite shown in FIG. 3A, except for that the pair of roll suspensions 144*a*, 144*b* bow towards one another.

Furthermore, as shown in FIG. 3B, a pressure equalization vent 184 formed in one of the supplementary frames 146*a*. This pressure equalization vent 184 may help to avoid build-up of pressure in the space between the two roll suspensions 144*a*, 144*b* and the pair of supplementary frames 146*a*, 146*b*.

Figure 3C:
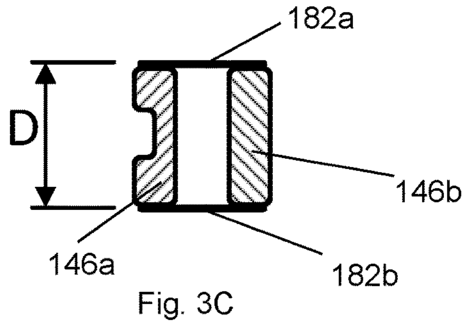
Figure 3D:
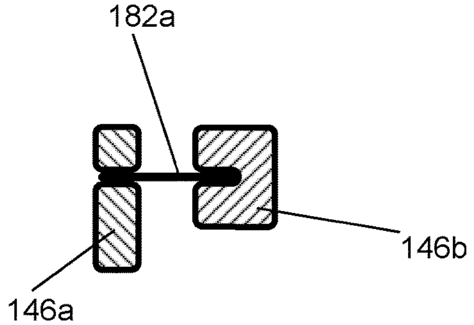

FIGS. 3C and 3D show other example mounting frame arrangements (optionally provided as a composite part). In particular, rather than providing roll suspensions, each mounting frame suspension shown in FIGS. 3C and 3D comprises a piece of elastic material 182*a*, 182*b* held taut between a pair of supplementary frames 146*a*, 146*b*. When installed in a loudspeaker, the/each piece of elastic material 182*a*, 182*b* may have no or little slack when held between the supplementary frames 146*a*, 146*b*, such that the elastic material 182*a*, 182*b* is not substantially stretched when the diaphragm 110 is at rest. The/each piece of elastic material may comprise elastic foam or (silicone) rubber.

FIG. 3C shows a composite part comprising two pieces of elastic material 182*a*, 182*b* separated by the two supplementary frames 146*a*, 146*b* by distance D (wherein supplementary frames 146 may be similar to those described above with reference to FIG. 3A).

In the example shown in FIG. 3D, the composite part comprises a single piece of elastic material 182.

The total stiffness of the mounting frame suspension(s) in the examples shown in FIGS. 3C and 3D is defined by the amount the elastic material 182(*a/b*) allows elastic elongation.

Figure 3E:
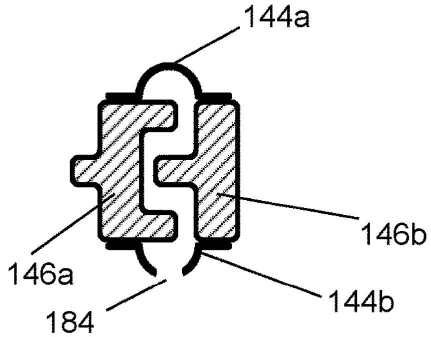

The example mounting frame arrangement (optionally provided as a composite part) of FIG. 3E is similar to that of FIG. 3A, except that the supplementary frames 146*a*, 146*b* overlap each other when projected onto a plane perpendicular to the movement axis, such that, when installed in a loudspeaker assembly, the overlapping portions of the supplementary frames 146 serve to prevent the drive unit frame 130 from being ejected out from the mounting frame 140 (e.g. in a crash event or another event that involves sudden deceleration of the loudspeaker). Furthermore, one roll suspension 144*b* comprises a pressure equalization vent 184 which may help to avoid build-up of pressure in the space between the two roll suspensions 144*a*, 144*b* and the pair of supplementary frames 146*a*, 146*b*.

Figure 3F:
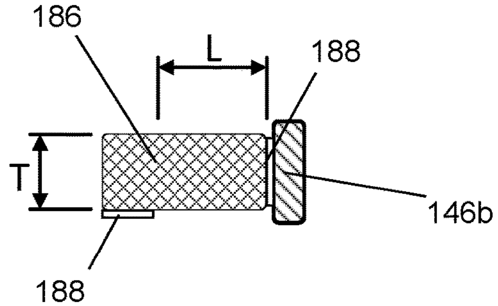
Figure 3G:
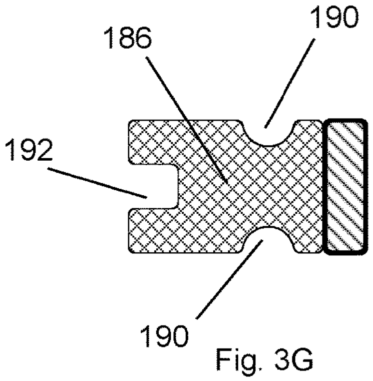
Figure 3H:
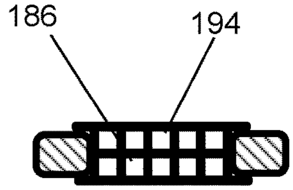

The example mounting frame arrangements (optionally provided as a composite part) shown in FIGS. 3F-H each comprise a block of elastic material 186 as a mounting frame suspension.

The block of elastic material used as a mounting frame suspension in FIG. 3F comprises non-pressed elastic foam. The stiffness of such a mounting frame suspension is defined by the elastic elongation of the foam, free length L, and thickness T. In this example, the mounting frame suspension (e.g. the block of elastic foam 186) may be attachable to the mounting frame and drive unit frame by one or more self-adhesive strips 188, for easy assembly of the drive unit frame in the mounting frame. The block of elastic material 186 may be attached to a supplementary frame 146*b* of the mounting frame 140.

The example mounting frame suspension shown in FIG. 3G is similar to that shown in FIG. 3F, except that block of elastic material 186 additionally includes a number of corrugations or cut outs 190, to help to tune the block of elastic material to a desired stiffness. The block of elastic material also comprises one or more snap-fit elements 192 (e.g. protrusions or recesses) for providing a snap-fit connection with the drive unit frame 130 and/or mounting frame 140 (in this case, to provide a snap-fit connection with the drive unit frame 130).

In the example mounting frame suspension shown in FIG. 3H, the block of elastic material 186 is hollow and preferably made from a rubber and comprises a plurality of cavities and/or corrugations 194 to increase the stability of the mounting frame suspension.

Figure 4:
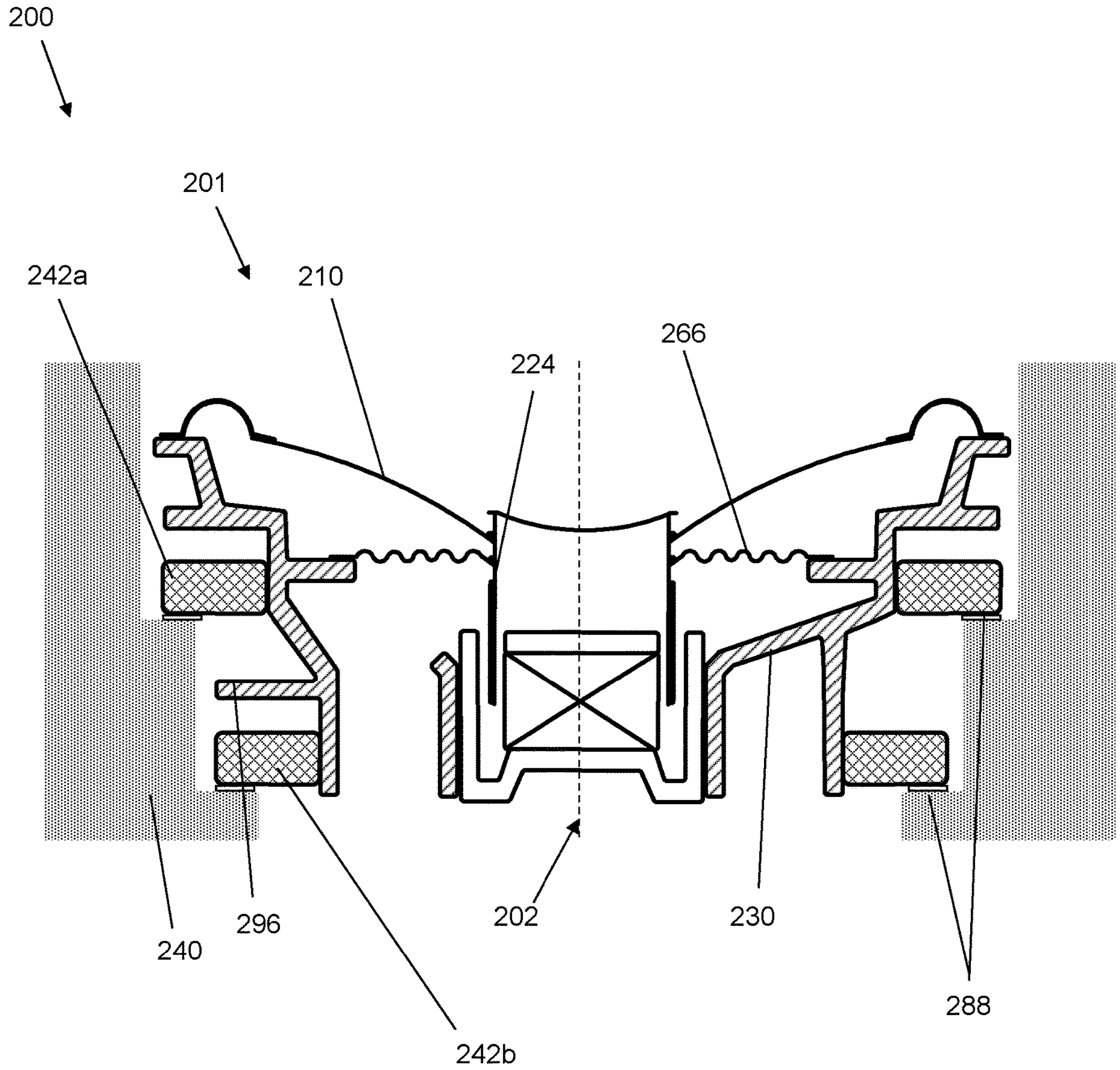
FIG. 4 shows a cross-section view of another example dipole loudspeaker assembly.

FIG. 4 shows a cross-sectional view of an example dipole loudspeaker assembly 200 including dipole loudspeaker 201. Dipole loudspeaker assembly 200 is similar to the dipole loudspeaker assembly 100 shown in FIG. 1.

Here, the drive unit frame 230 is suspended from the mounting frame 240 by two mounting frame suspensions 242*a*, 242*b*. The two mounting frame suspensions 242*a*, 242*b* are separated in a direction parallel to the movement axis 202. Each mounting frame suspension 242*a*, 242*b* is configured to be positioned at an equal distance from a centre of gravity plane in a direction parallel to the movement axis 202 on opposing sides of the centre of gravity plane when the diaphragm 210 is at rest. Providing two mounting frame suspensions 242*a*, 242*b* in this manner may help to improve stability of the dipole loudspeaker 200.

Unlike the example dipole loudspeaker shown in FIG. 1, in FIG. 4, the mounting frame suspensions 242*a*, 242*b* here are similar to that shown in FIG. 3F. In particular, each of the mounting frame suspensions 242*a*, 242*b* comprise a block of non-pressed elastic foam, which is attached directly to both the mounting frame 240 and the drive unit frame by an adhesive, e.g. by one or more self-adhesive strips 288.

Also, rather than being attached directly to the diaphragm 210, the spider 266 is secured to the tubular element 224 of the voice coil coupler (and therefore indirectly to the diaphragm 210). In particular, the spider 266 is secured at its outer rim to the drive unit frame 230 and at its inner rim to the tubular element 224 of the voice coil coupler.

In this example, the part of the mounting frame 240 that is shown is a foam material, such as an elastic foam material.

Another difference between dipole loudspeaker assembly 200 and dipole loudspeaker assembly 100, is that the drive unit frame 230 comprises one or more protruding flanges 296, which may help to aid manufacture, and in particular to facilitate the adhesion of the one or more mounting frame suspensions 242*a*, 242*b* to the mounting frame 240.

Figure 5:
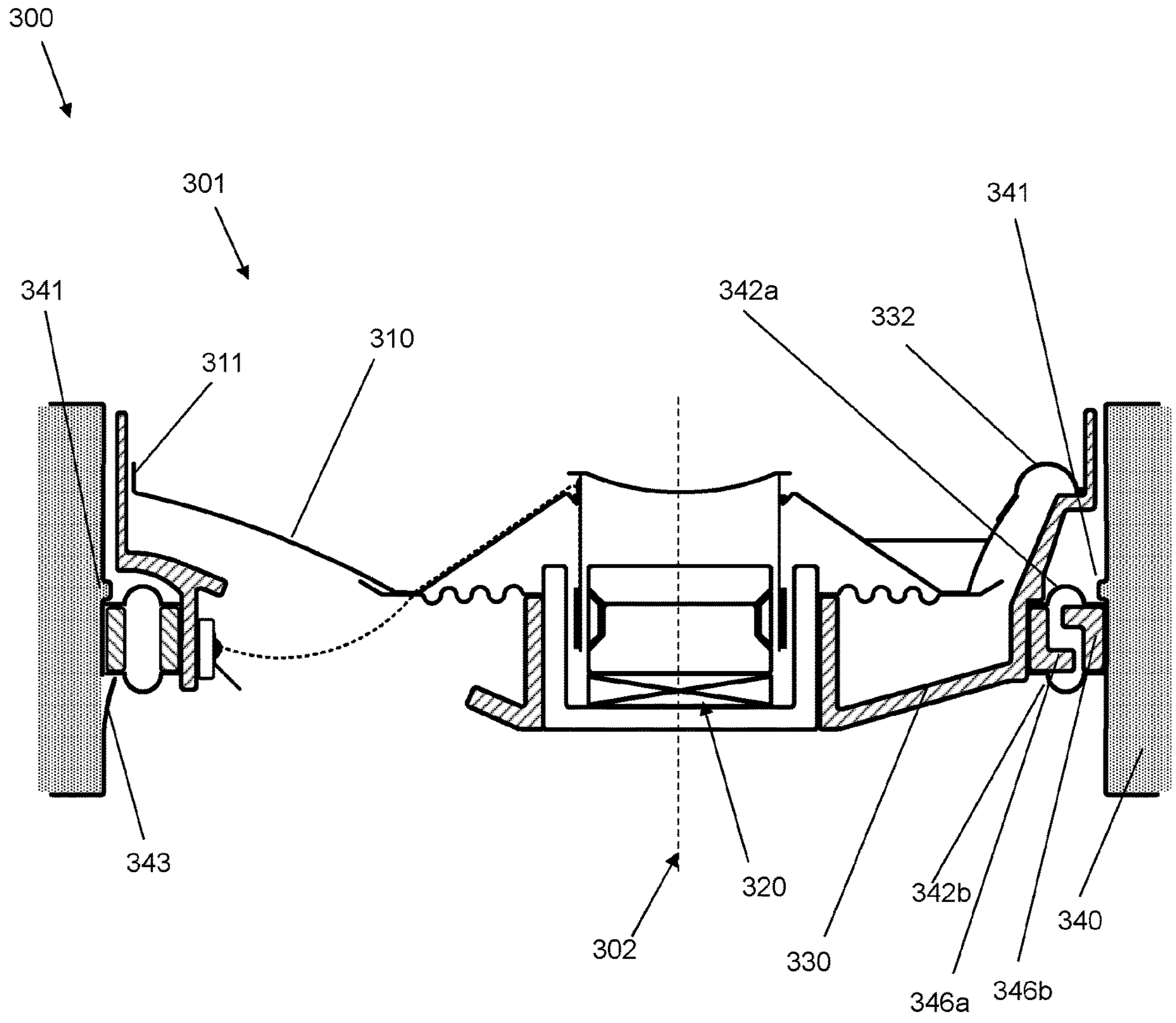
FIG. 5 shows a cross-section view of another example dipole loudspeaker assembly.

FIG. 5 illustrates an example dipole loudspeaker assembly 300 including dipole loudspeaker 301. Dipole loudspeaker assembly 300 is similar to dipole loudspeaker assembly 100 as shown in FIG. 1, except for that the drive unit suspension 332 does not extend completely continuously around diaphragm 310. Instead, in order to maximize the effective radiating surface area of the diaphragm 310 within the space provided by the mounting frame 340, the drive unit suspension 332 is interrupted at one or more locations around the outer rim (e.g. periphery) of the diaphragm 310. At any of the locations around the periphery of the diaphragm 310 where the drive unit suspension 332 is interrupted (e.g. at any locations where the drive unit suspension 332 is not present), the diaphragm 310 may comprise an upstanding or downward facing edge 311. As shown in FIG. 5, an upstanding edge 311 of the diaphragm extends in a direction substantially parallel with an outer portion of the drive unit frame 330 (in a direction substantially parallel with the movement axis 302). A gap between the upstanding edge 311 and the outer portion of the drive unit frame 330 is preferably minimised, and, as measured in a plane perpendicular to the movement axis 302, may be 2 mm or less (more preferably, 1.5 mm or less, more preferably 1 mm or less, more preferably 0.8 mm or less, in some cases even 0.5 mm or less).

Providing the upstanding edge 311 of the diaphragm 310 at locations around the periphery of the diaphragm 310 in which no drive unit suspension 332 is present, wherein a gap between the upstanding edge 311 and the drive unit frame 330 is narrow (preferably less than 1 mm), helps to ensure high friction for air movement between the diaphragm 310 and the drive unit frame 330 whilst still permitting movement of the diaphragm 310 relative to the drive unit frame 330 along the movement axis 302. This may help to reduce sound interference from the first and second radiating surfaces of the diaphragm (e.g. to reduce the amount of sound produced by the first radiating surface from reaching the second radiating surface via the gap).

Mounting frame 340 of dipole loudspeaker assembly 300 also comprises one or more safety stops 341 (e.g. protrusions). The safety stops 341 protrude into the space provided by the mounting frame 340 and are, together with overlapping portions of the supplementary frames 346*a*, 346*b*, configured to prevent the drive unit frame 330, and therefore the drive unit 320 from passing through the diaphragm 310 and being ejected out from the mounting frame 340, e.g. in a crash event or another event that involves a sudden deceleration of the loudspeaker 300 (e.g. where the loudspeaker 300 has been moving in the direction of the principal radiating axis of the first radiating surface). In particular, the safety stops 341 are configured to engage with the supplementary frame 346*b*, which in turn is configured to engage with an overlapping portion of the supplementary frame 346*a*, to prevent the drive unit frame 330, and therefore the drive unit 320 from passing through the diaphragm 310 and being ejected out from the mounting frame 340, e.g. in a crash event or another event that involves a sudden deceleration of the loudspeaker 300 The one or more safety stops 341 are preferably rigid.

In this example, the loudspeaker comprises a mounting frame arrangement (supplementary frames 346*a*, 346*b* and mounting frame suspensions 342*a*, 342*b*) formed as composite part similar to that illustrated in FIG. 3E.

As such, during manufacture, the drive unit frame 330 (and drive unit 320) may be inserted into the mounting frame 340 from the second (back) side (e.g. in a direction parallel to the principal radiating axis of the first radiating surface). The drive unit frame 330 may be pushed into the space provided by the mounting frame 340, until a supplementary frame 346 attached to the mounting frame suspensions 342 engages with (e.g. butts against) the safety stops 341 of the mounting frame 340. As the supplementary frames 346 overlap each other, the pair of roll suspensions (i.e. the pair of mounting frame suspensions 342*a*, 342*b*) are not overexerted or damaged during assembly. The supplementary frame 346 and therefore the drive unit frame 330) are then locked into position by one or more snap-fit connections (e.g. by snap-fit element 343) in order to form the loudspeaker assembly 300.

Figure 6:
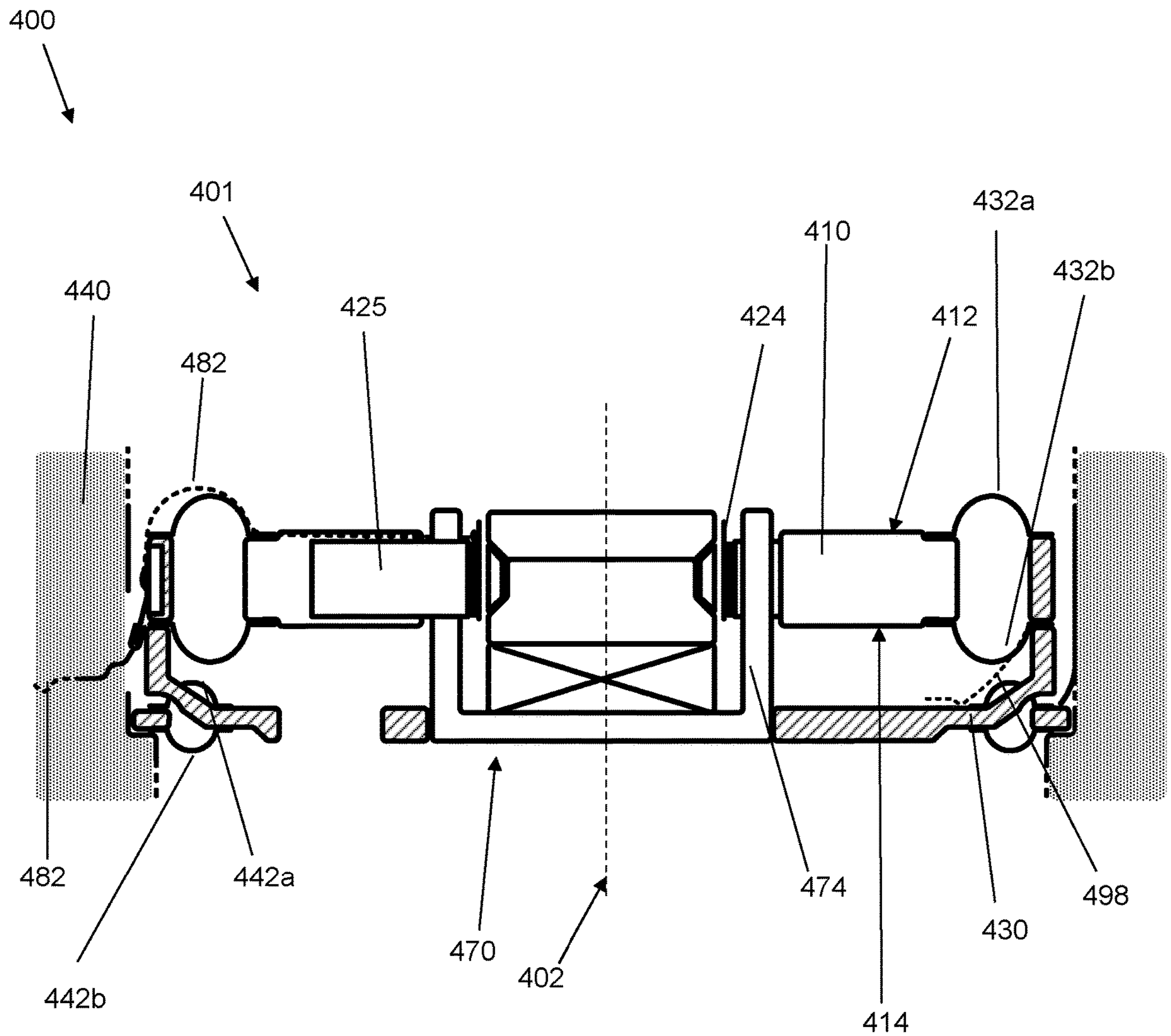
FIG. 6 shows a cross-section view of another example dipole loudspeaker assembly.

FIG. 6 illustrates an example dipole loudspeaker 400 including dipole loudspeaker 401. Dipole loudspeaker 400 is similar in principle to dipole loudspeaker 100, except for a number of differences which are discussed here.

In particular, the diaphragm 410 of dipole loudspeaker 401 is not a sheet-like diaphragm (e.g. of paper), but instead comprises a solid block of light-weight material such as extruded or expanded foam, e.g. of polypropylene (PP), polyurethane (PU) or polystyrene (PS). The diaphragm 410 may have a thickness, in a direction perpendicular to the movement axis 402 of more than 5 mm, for example.

The magnetic U-yoke 474 of the magnet unit 470 is a slotted magnetic yoke (e.g. comprises a number of slots extending therethrough in a direction parallel to the movement axis 402).

In this example, the voice coil coupler includes a tubular element 424 and a plurality of ribs 425 which extend radially outwardly from the tubular element 424 through the slots in the slotted magnetic U-yoke 474. The ribs 425 are plate-like and extend into an interior of the diaphragm 410. The ribs 425 are preferably made of a stiff, light-weight, non-conductive material, such as balsa wood. In this way, the diaphragm 410 may be reinforced.

Also, in contrast to dipole loudspeaker 101, dipole loudspeaker 401 comprises two drive unit suspensions 432*a*, 432*b*, and in particular two roll suspensions. A first of the roll suspensions 432*a* is attached to the first radiating surface 412 of the diaphragm, and a second of the roll suspensions 432*b* is attached to the second radiating surface 414 of the diaphragm 410. This may help to stabilize the diaphragm 410.

In this example, one or more of the mounting frame suspensions 442*a*, 442*b* are interrupted to allow a portion of the drive unit frame 430 to pass therethrough. In particular, there are one or more small discontinuities in one of the pair of roll suspensions 442*a* to allow a portion of the drive unit frame 430 to pass therethrough. However, these one or more discontinuities are small enough such that the baffle effect of the mounting frame suspensions 442*a*, 442*b* is still achieved.

In FIG. 6, the dotted line indicated as 498 represents the maximum extent of the diaphragm 410 and drive unit suspension 432*b* in a direction towards a mounting frame suspension 442*a*. For performance reasons, it is important to ensure that the dipole loudspeaker assembly 400 is designed/constructed to avoid contact between the drive unit suspension 432*b*, diaphragm 410 and the mounting frame suspension 442*a*.

In this example, the wires 482 for energizing the voice coil 422 extend over the first radiating surface 412 of the diaphragm 410, over drive unit suspension 432*a*, and through the mounting frame 440 to a power source.

Figure 7:
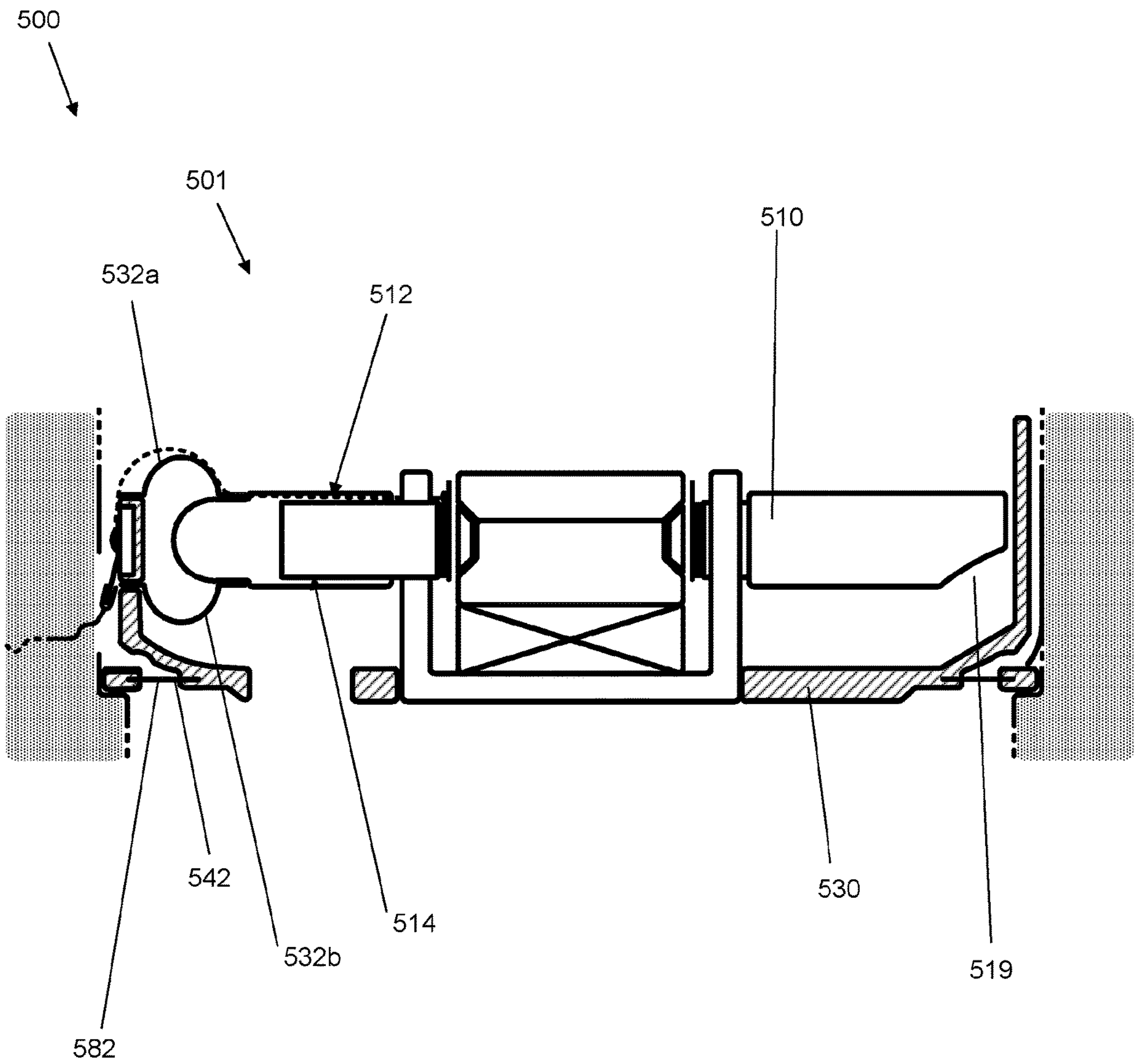
FIG. 7 shows a cross-section view of another example dipole loudspeaker assembly.
Figure 8A:
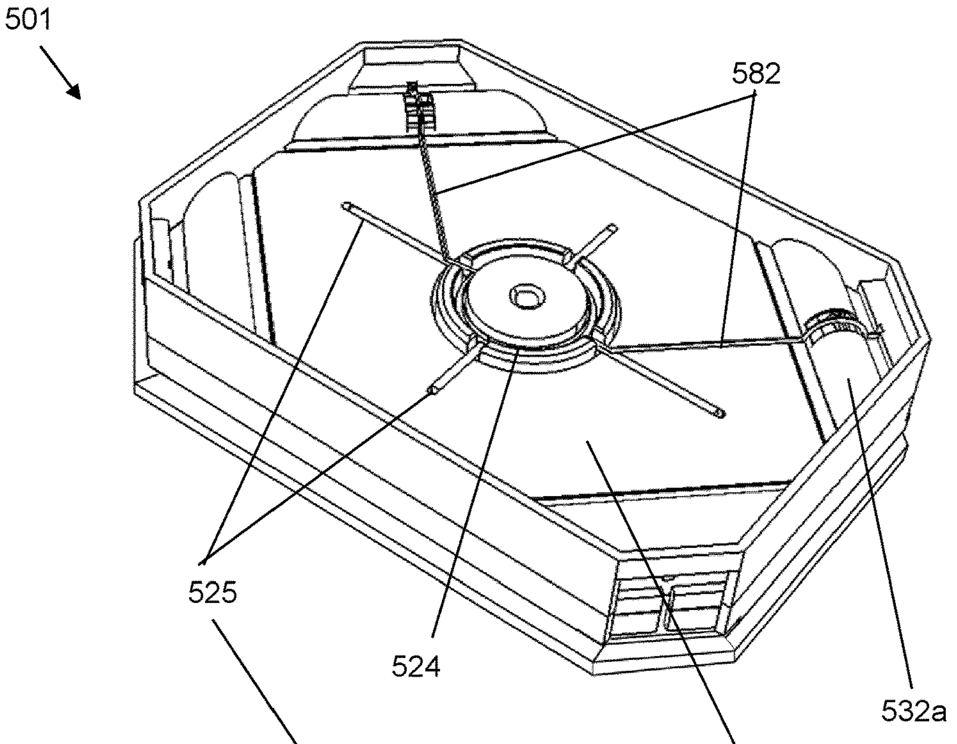
FIG. 8A shows a perspective view of the dipole loudspeaker included in the dipole loudspeaker assembly of FIG. 7
Figure 8B:
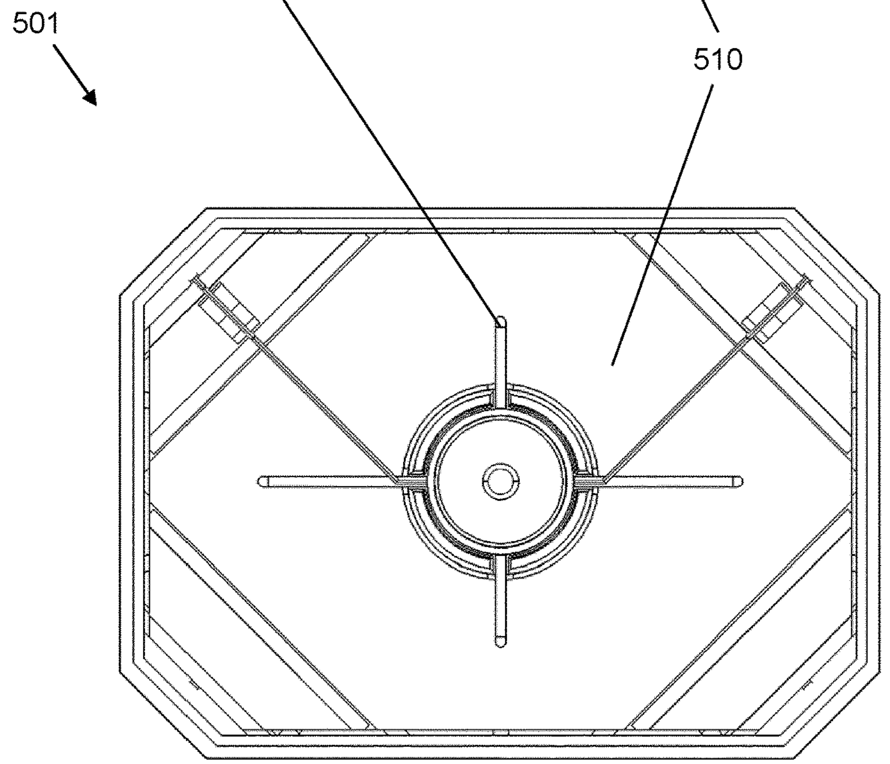
FIG. 8B shows another perspective view of the dipole loudspeaker included in the dipole loudspeaker assembly of FIG. 7.

FIG. 7 and FIGS. 8A and 8B show different views of an example dipole loudspeaker assembly 500 including dipole loudspeaker 501 that is similar to the dipole loudspeaker assembly 400 shown in FIG. 6.

Similar to dipole loudspeaker 401, and as shown in FIGS. 8A and 8B, a plurality of ribs 525 extend radially outwardly from a tubular element 524 of the voice coil coupler through slots in the slotted magnetic U-yoke. The ribs 525 are plate-like and extend into an interior of the diaphragm 510. Lead wires 582 extend over the diaphragm 510 and over the drive unit suspension 532*a*.

In contrast to dipole loudspeaker 401, and as shown in FIG. 7, in dipole loudspeaker 501 one or more portions of the peripheral edge of the diaphragm 510 extending between the first radiating surface 512 and the second radiating surface 514 of the diaphragm 510 are curved (see left-hand side of diaphragm 510 as shown in FIG. 7). This may help to maximize the effective radiating surface area of the first radiating surface 512 of the diaphragm 510, especially if one (or both) of the roll suspensions 532*a*, 532*b* is interrupted (as best shown in FIGS. 8A and 8B).

The diaphragm 510 is also shaped to avoid interference with the drive unit frame 530. In particular, cut out 519 of the diaphragm 510 helps to avoid interference with the drive unit frame 530 (see right-hand side of diaphragm 510 as shown in FIG. 7).

As shown by FIG. 7, the mounting frame suspension 542 of this loudspeaker assembly 500 is similar to the mounting frame suspension shown in FIG. 3D. Specifically, the mounting frame suspension 542 comprises a piece of elastic material 582, which may comprise high elastic and over moulded rubber, e.g. silicone rubber.

Figure 9A:
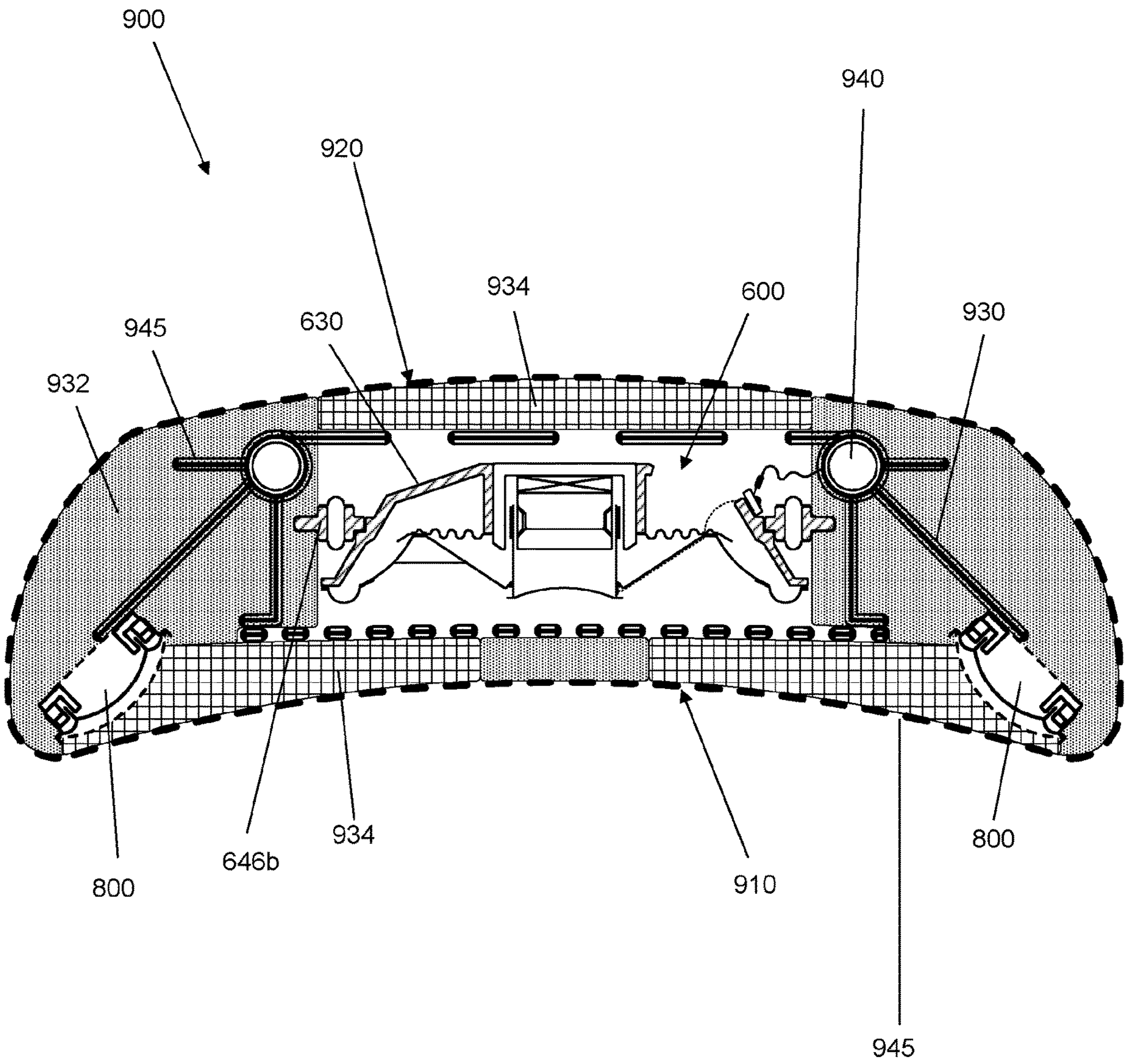
FIGS. 9A-9C show an example dipole loudspeaker assembly wherein the loudspeaker is incorporated in a headrest.
Figure 9B:
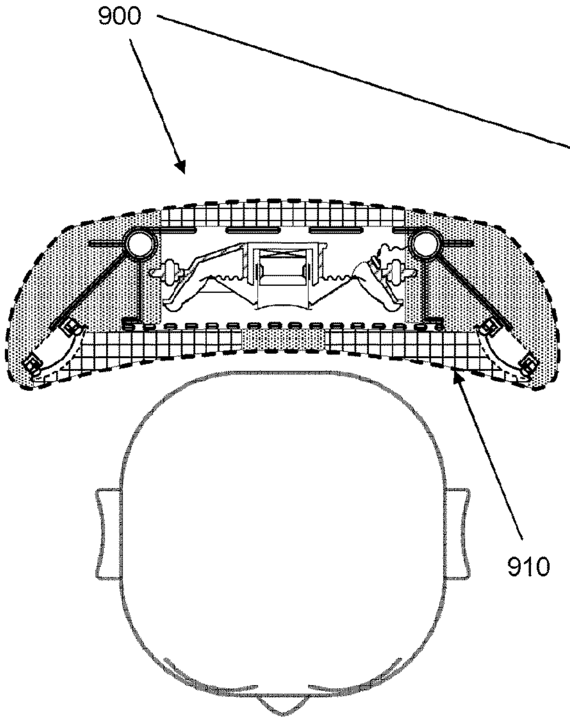
Figure 9C:
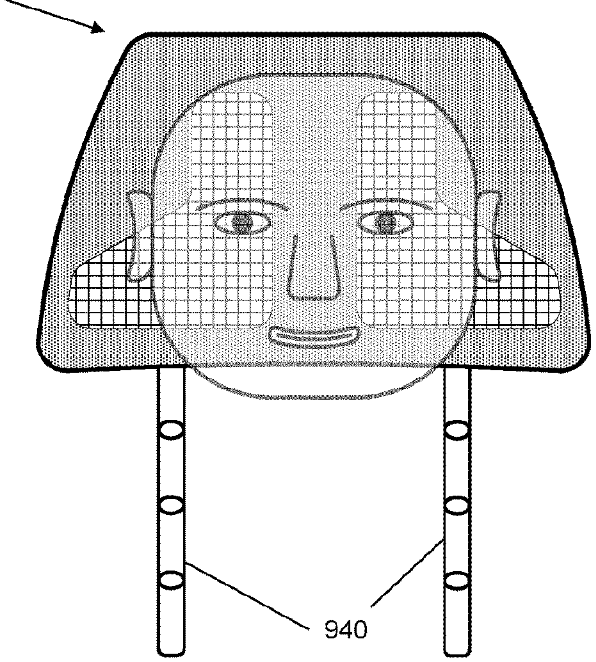

FIGS. 9A-9C show an example dipole loudspeaker assembly 600 in which a loudspeaker 601 is mounted in a headrest 900 of a seat (only the headrest of the seat is shown in these figures). In many respects, the components of the loudspeaker assembly 600 are similar to those of loudspeaker assembly 100, with components named in an alike fashion. However, for completeness, any loudspeaker disclosed herein, such as example loudspeakers 101, 201, 301, 401, 501 may be mounted instead of loudspeaker 601 in the head rest 900.

The headrest 900 comprises a rigid framework 930, rigid mounting pins 940 (which are used to attach the headrest to the remainder of the seat (not shown), support foam 932 (which may be acoustically opaque) and acoustic transparent foam 934.

The support foam 932 forms a waveguide which at least partially (preferably entirely) surrounds the diaphragm of the loudspeaker 601 (in a place perpendicular to the movement axis) and is configured to guide sound produced by the first and/or second radiating surface of the diaphragm out of opposite sides of the headrest 900.

The rigid framework 930 and rigid mounting pins 940 form part of a rigid seat frame of the seat. The mounting frame suspensions of the loudspeaker assembly 600 helps inhibit vibrations generated by the moving diaphragm 210 of the loudspeaker 200 from propagating into the body of a user sat in the seat. In this example, the entire rigid seat frame can be viewed as the mounting frame of the loudspeaker assembly 600, though it is also possible to view any structure from which the drive unit frame of the loudspeaker 601 is suspended as the mounting frame (e.g. it would be possible for just the supplementary frame 646*b* to be viewed as the mounting frame).

As illustrated in FIGS. 9B and 9C, the seat which incorporates the headrest 900 (the remainder of the seat is not shown) is configured to position a user who is sat down in the seat such that at least one (and preferably each) ear of the user is located at a listening position that is 40 cm or less (more preferably 30 cm or less, more preferably 25 cm or less, more preferably 20 cm or less, more preferably 15 cm or less) from the first radiating surface of the loudspeaker 601.

The headrest has a front surface 910 configured to face towards the head of a user sat in the seat, and a back surface configured to face away from the head of the user sat in the seat. Loudspeaker 601 is mounted in the headrest 900 so that the first radiating surface faces the front surface 910 of the headrest 900. The supplementary frame 646*b* of the loudspeaker assembly 600 is configured to attach to the remainder of the mounting frame via one or more snap-fit connections.

Dipole loudspeaker 601 is mounted in the headrest 900 so that the headrest 900 is configured to allow sound produced by the first radiating surface of the diaphragm 100 to propagate out through a front surface 910 of the headrest 900 (via acoustic transparent foam 934) and to allow sound produced by the second radiating surface of the diaphragm to propagate out from the back surface 920 of the headrest 900 (via acoustic transparent foam 934). In particular, as shown in FIG. 9, the framework 930 towards the back surface 920 of the headrest 900 may be sufficiently open (e.g. the framework 930 may define a number of apertures therein) to allow the sound produced by the second radiating surface of the diaphragm to propagate out from the back surface 920.

One or more additional loudspeakers may also be mounted in the headrest 900. In this example, two directional mid-high frequency loudspeakers 800 are mounted in the headrest 900.

An acoustic-transparent textile or perforated leather 945 may substantially cover the headrest 900 in order to allow the sound produced by the loudspeaker 100 to propagate therethrough.

Technical considerations for designing a loudspeaker for use in a loudspeaker assembly (such as dipole loudspeakers 101, 201, 301, 401, 501, 601) are now considered with reference to FIG. 10A-10H.

Figure 10A:
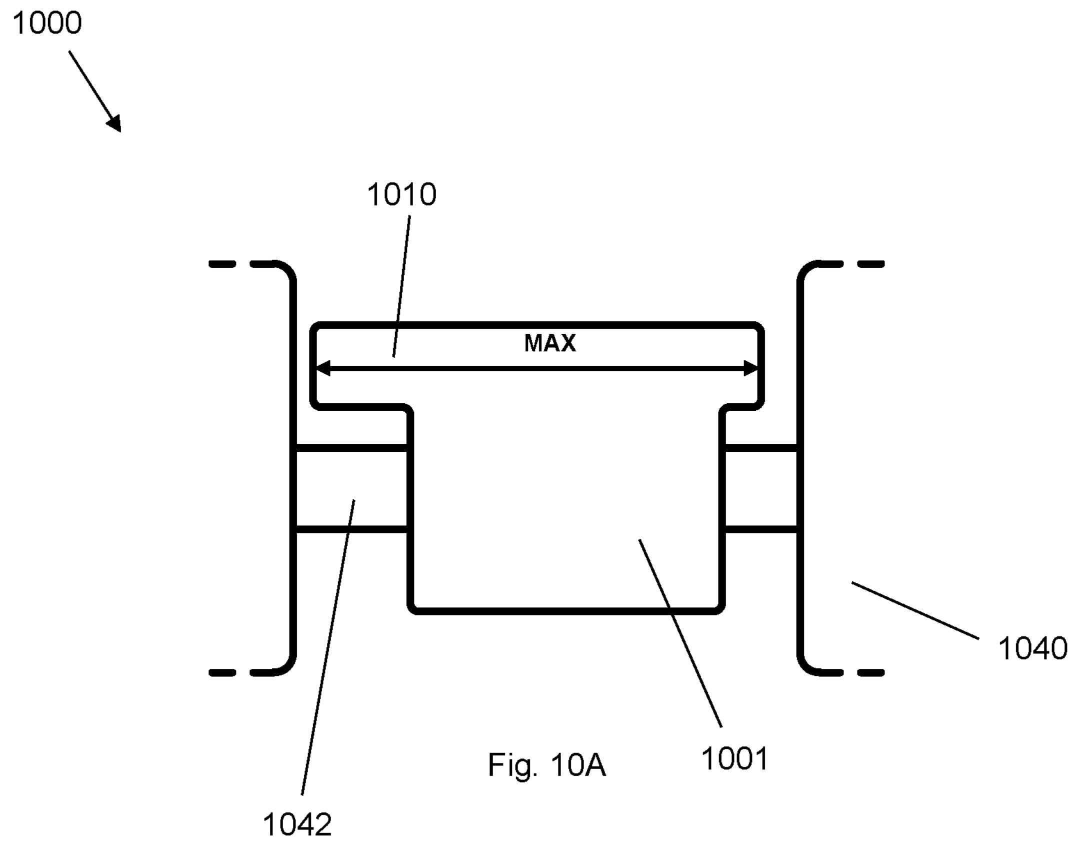
FIGS. 10A-10H illustrate the technical considerations for designing a loudspeaker for use in a loudspeaker assembly.
Figure 10B:
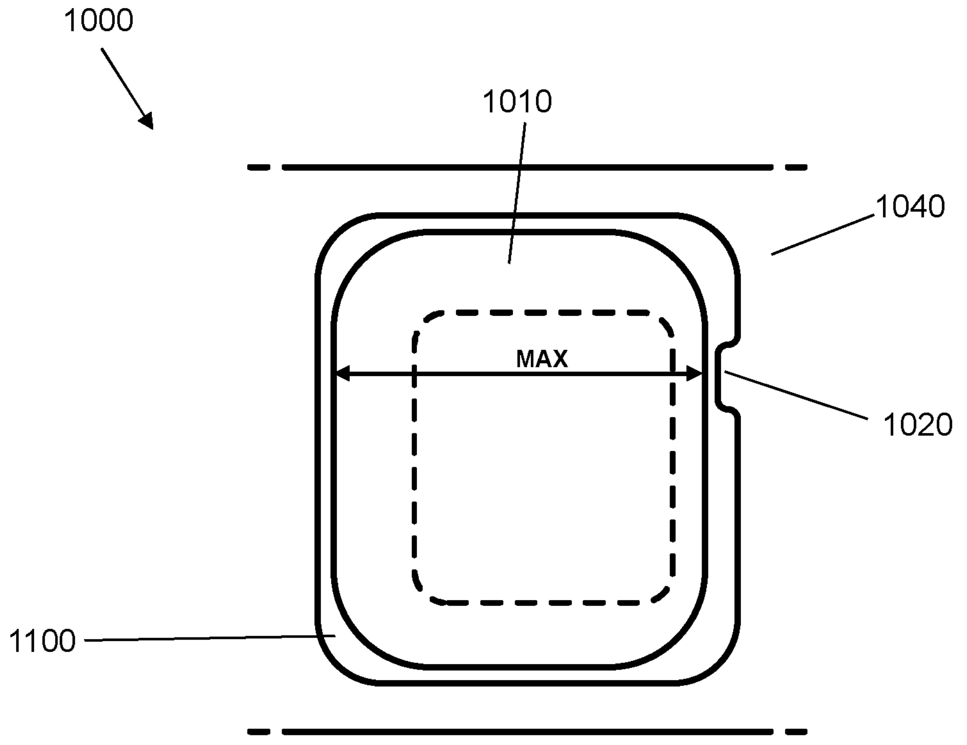

FIGS. 10A and 10B show a simplified cross-sectional view, and a front view, of a loudspeaker assembly 1000, respectively.

First, the available space inside the mounting frame 1040 (e.g. in a headrest) for accommodating the loudspeaker 1001 including diaphragm 1010 is evaluated.

Then, the dimension and shape of the diaphragm is determined by providing an optimum shape and sized diaphragm 1010 in the space available. The optimum shape may be limited by the manufacturability of different shaped diaphragms, or by obstacles such as other required structural elements in the headrest (e.g. obstacle 1020 in FIG. 10B). Circular, oval or racetrack-shaped diaphragms may be commonly used.

Next, one or more mounting frame suspensions 1042 for attaching a drive unit frame of the loudspeaker 1001 to the mounting frame 1040 are designed. In particular, such mounting frame suspensions 1042 are preferably designed without significantly affecting the radiating surface area, nor the height, of the dipole loudspeaker (by designing the/each mounting frame suspension such that the/each mounting frame suspension, as projected onto a plane perpendicular to the movement axis, at least partially overlaps with one or more elements selected from the diaphragm and the at least one drive unit suspension as projected onto the same plane, and such that the at least one mounting frame suspension is formed in a gap 1100 between the drive unit frame and the mounting frame and extends substantially continuously around the drive unit frame).

Next, the acoustic sealing of the one or more mounting frame suspensions 1042 is evaluated to ensure that sound radiating from a first radiating surface of the dipole loudspeaker is prevented from problematically interfering with antiphase sound radiating from the second radiating surface via gap 1100.

Next, the stiffness of the one or more mounting frame suspensions 1042 is evaluated.

Figure 10C:
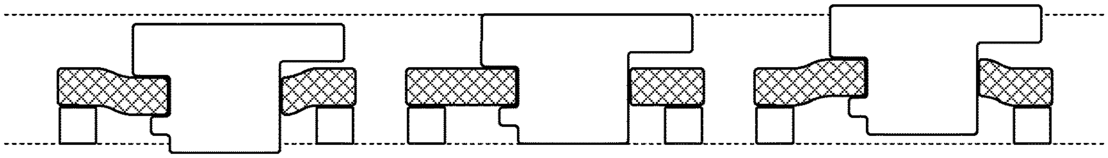
Figure 10D:
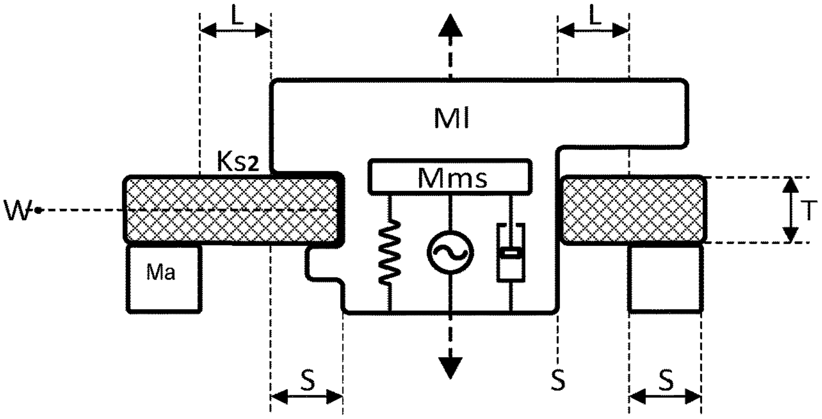
Figure 10E:
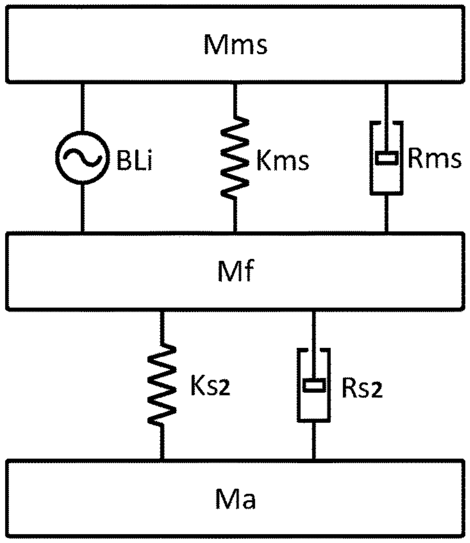

FIG. 10C-E illustrate a model that may be used to calculate the total stiffness $K_{S2}$ and tuning frequency $F_{S2}$ of the mounting frame suspension 1042, assumed here to be a single mounting frame suspension comprising elastic rubber or foam. A finite element modelling could alternatively be used to calculate the total stiffness $K_{S2}$ and tuning frequency $F_{S2}$ of the mounting frame suspension 1042.

Based on the model of FIGS. 10C-E, the total stiffness $K_{S2}$ [N/m] and tuning frequency $F_{S2}$ [Hz] of the mounting frame suspensions 1042 is given by where we consider Ma to be grounded (for evaluation or measuring purpose):

$$K_{S2} = \frac{ET^3W}{L^3}$$

$$F_{S2} = \frac{1}{2\pi}\sqrt{\frac{K_{S2}}{M_n}}$$

wherein:

E=Young's modulus [N/m$^2$]

T=thickness of the mounting frame suspension [m]

W=width of mounting frame suspension (e.g. between inner and outer rim) [m]

L=free or unsupported length of mounting frame suspension (e.g. when no force placed on mounting frame suspension) [m]

S=length of portion of mounting frame suspension that is supported or fixed on the mounting frame [m]

Mms=moving mass of the loudspeaker, wherein the moving mass of the loudspeaker=mass of the diaphragm+air load+voice coil+part of the drive unit suspension [kg];

$M_f$=mass of drive unit frame+drive unit+part of drive unit suspension [kg];

MI=mass of the loudspeaker=$M_f$+Mms [kg].

Ma=mass of headrest 'application' [kg]

$R_{S2}$=mechanical losses of mounting frame suspension [Ns/m];

BLi=motor force [N];

Kms=stiffness of drive unit suspension [N/m]

Rms=mechanical losses (friction) of drive unit suspension [Ns/m]

Here, the 'application' is the mass of a body which comprises the mounting frame. Typically this would be the mass of the headrest together with the mass of the backrest portion of the seat frame of a car seat.

Figure 10F:
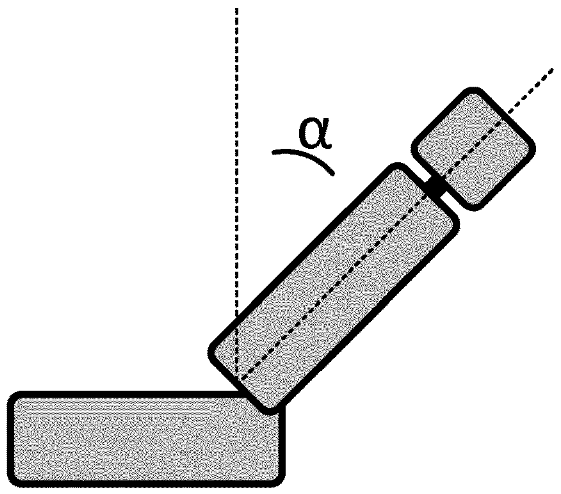
Figure 10G:
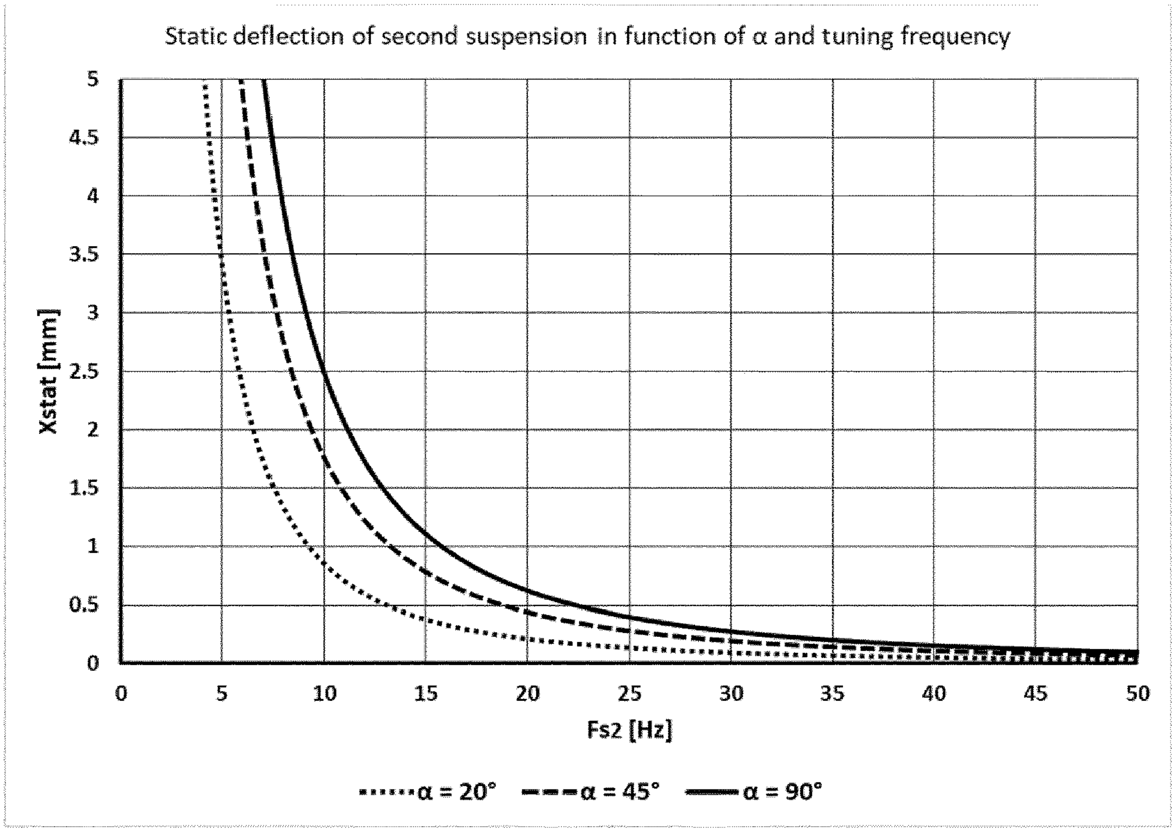
Figure 10H:
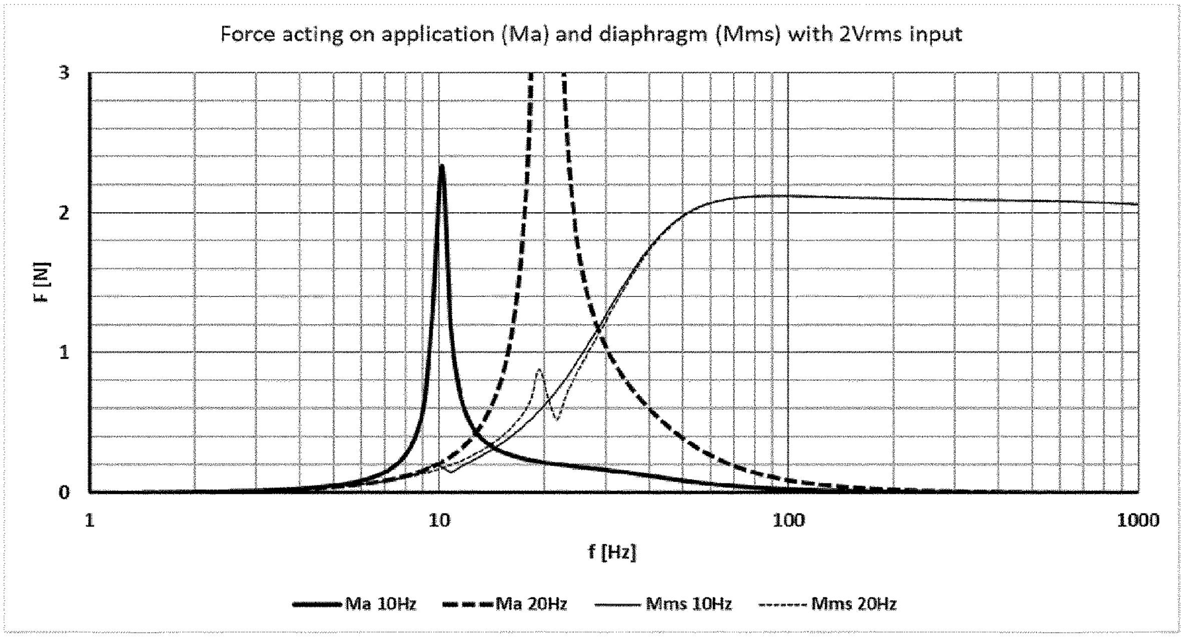

Example values for these parameters used with the model to produce the graphs shown in FIGS. 10G and 10H are as follows:

Rdc=3.4 [Ohm]

BLi=2.5 [Tm]

Kms=0.5 [N/mm]

Rms=1 [Ns/m]

Mms=10 [g]

Mf=250 [g]

Ma=5 [kg]

Ks2=1 [N/mm (results in Fs2=10 Hz)] OR Ks2=4 [N/mm (results in Fs2=20 Hz)]

Rs2=1 [Ns/m]

FIG. 10F shows a car seat, wherein an axis extending through the backrest and headrest forms an angle $\alpha$ with a vertical direction [deg].

FIG. 10G shows a plot of the static deflection, $Xstat_t$ of the mounting frame suspension [m] against the tuning frequency Fs2 [Hz] of the mounting frame suspension.

As shown by FIG. 10G, at all values of a, if the tuning frequency of the mounting frame suspension is below 10 Hz, then the required size of Xstat becomes excessively large to be accommodated by a practical loudspeaker.

Finally, FIG. 10H shows a graph of the force acting on the application (e.g. mounting frame), Ma, and force acting on the moving mass of the loudspeaker (Mms) against frequency, for a 2 Vrms input and a tuning frequency $F_{S2}$ of the mounting frame suspension of both 10 Hz and 20 Hz.

As shown by FIG. 10H, at a tuning frequency $F_{S2}$=10 Hz, the force transferred to the application is low, and the diaphragm (Mms) has a smooth frequency response. As the tuning frequency is raised to $F_{S2}$=20 Hz, there is an increased force acting on the application and this force occurs at a higher frequency, and the diaphragm (Mms) has a less smooth frequency response, although this less smooth frequency response is around $F_{S2}$=20 Hz which causes few problems since this is below the operational audio range.

Taking account of both FIG. 10G and FIG. 10H, it can be seen that generally a lower tuning frequency $F_{S2}$ is better for reducing the amount of vibrations passed to a user (via the application), but this comes at the expense of a large static deflection which becomes impractical at below ~10 Hz. Accordingly, a preferred tuning frequency $F_{S2}$ of the mounting frame suspension is between 10 and 30 Hz, and more preferably between 10 and 20 Hz.

FIGS. 11A-G show another dipole loudspeaker assembly 1100 for producing sound at bass frequencies.

The dipole loudspeaker assembly 1100 shown in FIGS. 11A-G is provided in the form of a dipole loudspeaker module configured to be mounted in a headrest of a seat. As such, the dipole loudspeaker assembly 1100 of FIGS. 11A-G will be referred to as a dipole loudspeaker module 1100 in the discussion that follows.

The dipole loudspeaker module 1100 comprises a dipole loudspeaker 1101 and a mounting frame suspensions 1142*a*, 1142*b* which are similar to the dipole loudspeaker 101 and mounting frame suspensions 142*a*, 142*b* shown in FIG. 1. Alike features have been given alike reference numerals and need not be described further, except for certain significant differences which are described below.

Figure 11A:
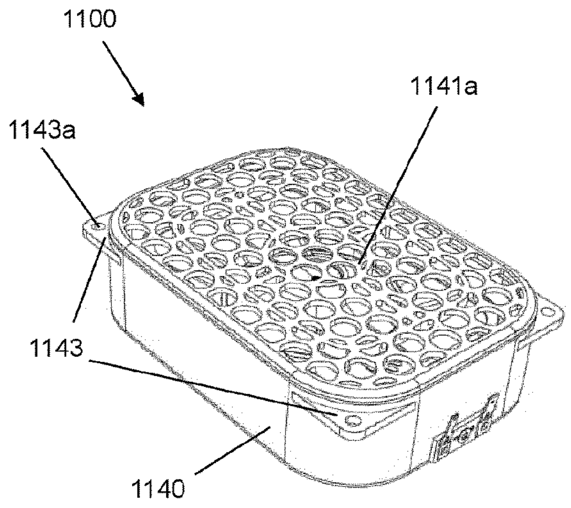
FIGS. 11A-G show another dipole loudspeaker assembly for producing sound at bass frequencies.
Figure 11B:
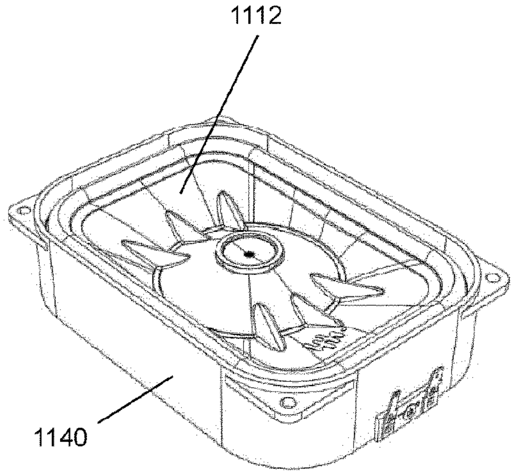

FIG. 11A shows a front side of the dipole loudspeaker module 1100, intended to face towards the head of a user sat in the seat. FIG. 11B shows the same front side of the dipole loudspeaker module 1100, but with the first protective grille 141*a* omitted.

Figure 11C:
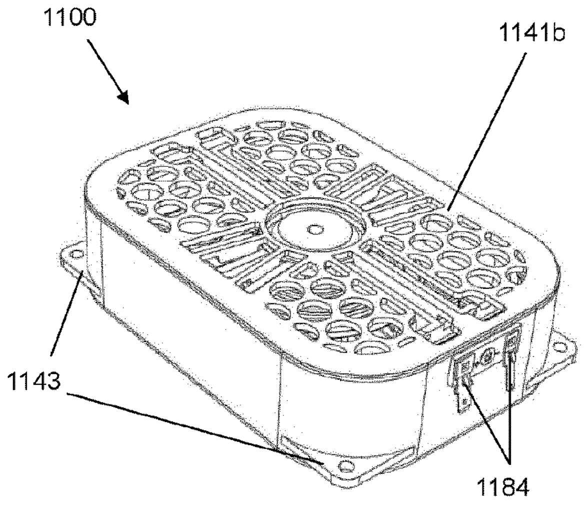
Figure 11D:
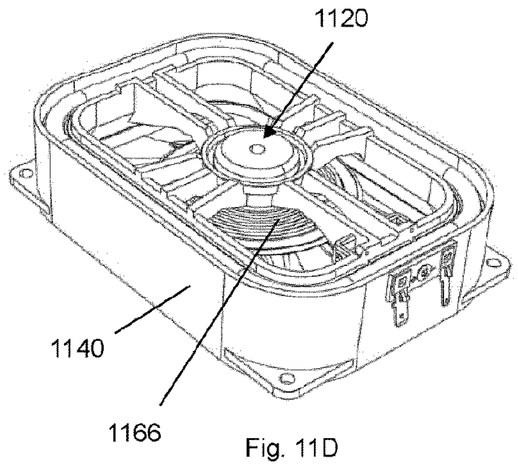

FIG. 11C shows a back side of the dipole loudspeaker module 1100, intended to face away from the head of a user sat in the seat. FIG. 11D shows the same back side of the dipole loudspeaker module 1100, but with the second protective grille 141*b* removed.

Figure 11E:
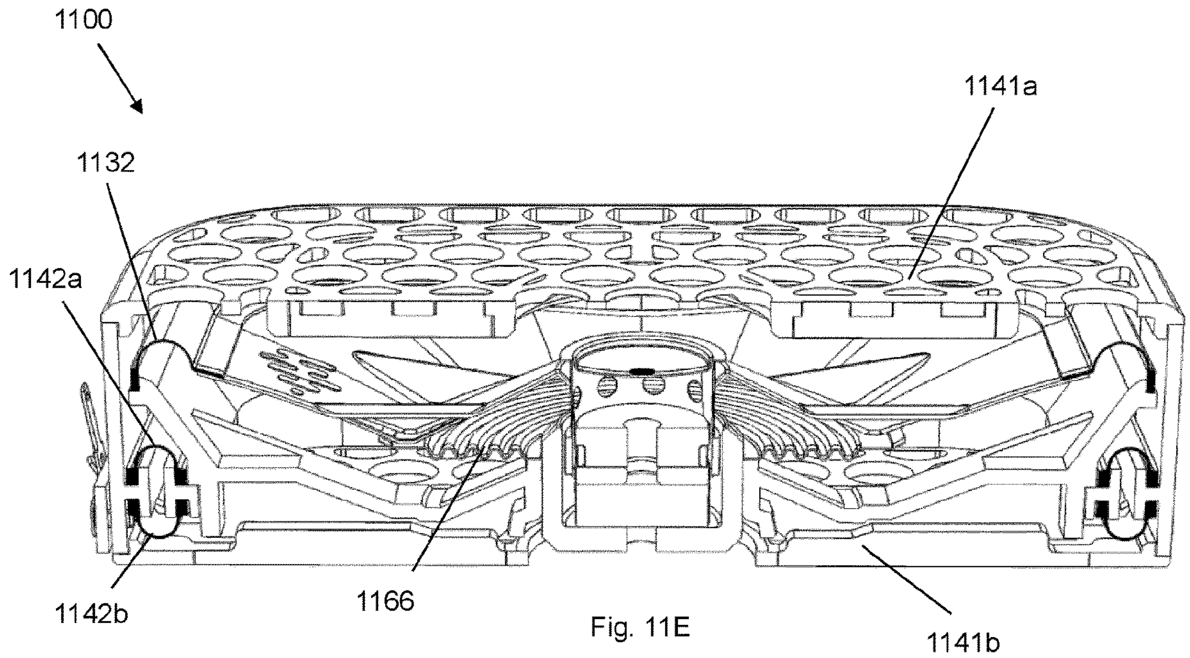
Figure 11F:
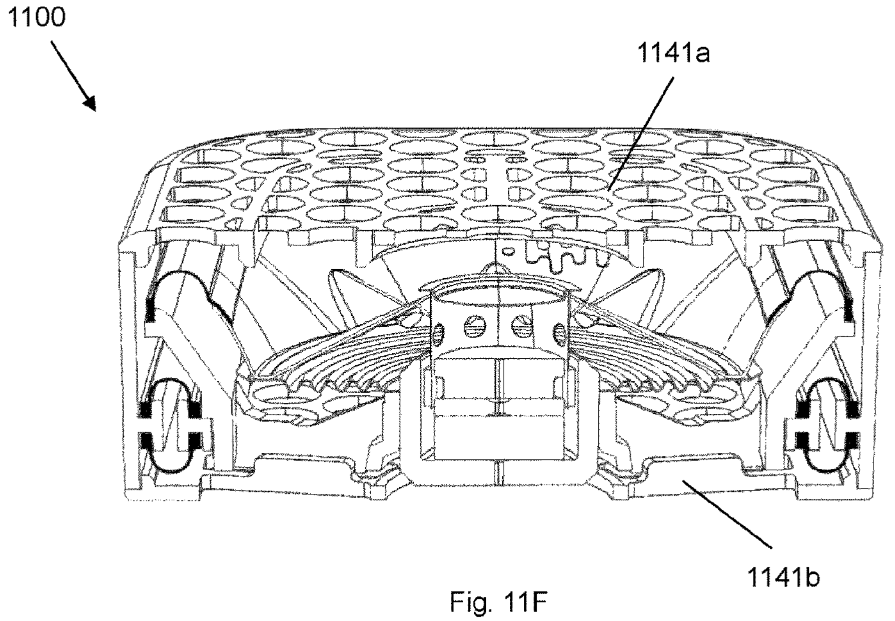

FIGS. 11E and 11F show cross sections through the dipole loudspeaker module 1100.

Figure 11G:
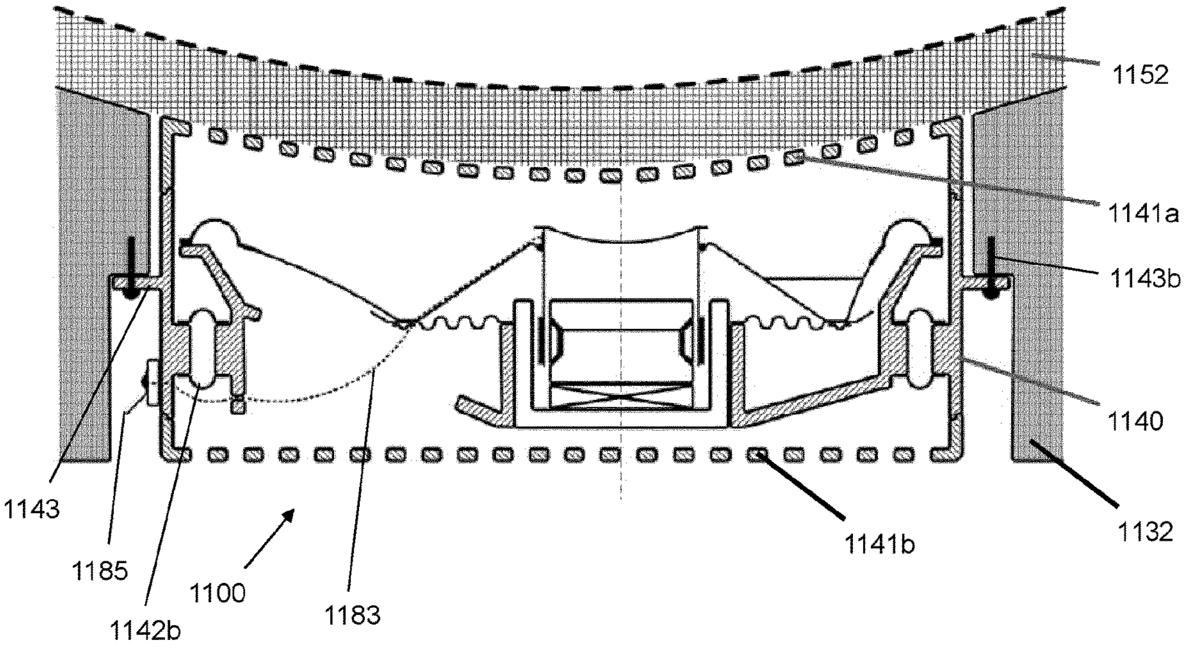

FIG. 11G shows the dipole loudspeaker module 1100, as mounted in a headrest of a seat (in this example, a car seat). Here the headrest is only partially shown, with only a support foam region 1132 and an open cell foam region 1152 of the headrest visible.

The mounting frame 1140 of the dipole loudspeaker module 1100 differs from the mounting frame 140 of FIG. 1, in that it includes:

attachment formations 1143 on the mounting frame 1140, wherein the attachment formations are configured to attach the mounting frame 1140 to rigid structure of the headrest which in this example is a rigid frame embedded in a support foam region of a headrest of a seat;

a first protective grille 1141*a* which is attached to the mounting frame 1140 and is positioned in front of the first radiating surface 1112 of the diaphragm 1110;

a second protective grille 1141*b* which is attached to the mounting frame 1140 and is positioned in front of the second radiating surface 1114 of the diaphragm 1110.

In the example of FIGS. 11A-G, the attachment formations 1143 have the form of ears protruding radially outwards from the dipole loudspeaker module 1100. In this example, the ears include screw holes 1143*a*.

In the example of FIG. 11G, the dipole loudspeaker module 1100 mounted in a support foam region 1132 of a headrest (here, a car headrest), with the attachment formations 1143 being used to attach the dipole loudspeaker module 1100 to the support foam region using screws 1143*b* which screw into a rigid frame embedded in the support foam region 1132 after passing through the screw holes 1143*a* in the attachment formations 1143. When the dipole module 1100 is installed in the support foam region 1132 via the screw holes 1143*a* and screws 1143*b*, the support foam region may optionally be viewed as part of the mounting frame of the dipole loudspeaker module 1100.

As illustrated by FIGS. 11A, 11C and 11G, the first and second protective grilles 1141*a*, 1141*b* are in this example acoustically transparent, but provide two functions:

They help to protect the dipole loudspeaker 1101, e.g. during testing and handling at a headrest manufacturer They provide a surface for supporting an open cell foam which is used to cover the dipole loudspeaker module 1100 during installation in a headrest In the example of FIG. 11G, the first protective grille 1141*a* is shaped to follow the contours of a surrounding support foam region 1132 of the headrest. The first protective grille 1141*a* and at least part of the surrounding support foam region 1132 are covered with open cell foam to provide a desired headrest shape. The contours of the first protective grille 1141*a* and surrounding support foam region 1132 are preferably mutually shaped so that they can be covered with a uniform thickness of open cell foam 1152 (as shown in FIG. 11G) to provide the desired headrest shape. Here, using a uniform thickness of foam helps to simplify the manufacturing process.

The second protective grille 1141*b* may also be shaped to follow the contours of a surrounding support foam region, and may also be covered with an open cell foam to provide a desired headrest shape, although this is not shown in FIG. 11G.

The module 1100 has two electrical connectors 1185, wherein each electrical connector 1185 is for receiving a cable (not shown) in order to connect the voice coil 122 to an audio source (not shown) via the cable (and wires 1183). Unlike in FIG. 1, the electrical connectors 1185 shown in FIG. 11 are located on an outside of the mounting frame 1140. The present inventors observe that locating the electrical connectors 1185 on the outside of the mounting frame 1140 has an advantage that any cables connected to the electrical connectors 1185 will not jeopardize movement of the loudspeaker suspended in the frame. Note that the wires 1183 are nicely extended over the mounting frame suspension 1142*b*, all inside the module 1100.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

REFERENCES

A number of publications are cited above in order to more fully describe and disclose the invention and the state of the art to which the invention pertains. Full citations for these references are provided below.

The entirety of each of these references is incorporated herein.

WO2005/015950A1

WO2008/135857A1

WO2019/121266A1

WO2019/121072

PCT/EP2020/064577

"Dynamical Measurement of the Effective Radiating area SD", Klippel GmbH (https://www.klippel.de/fileadmin/klippel/Files/Know_How/Application_Notes/AN_32_Effective_Radiation_Area.pdf

The invention claimed is:

1. A dipole loudspeaker assembly for producing sound at bass frequencies, the dipole loudspeaker assembly comprising:

a dipole loudspeaker, including:

a diaphragm having a first radiating surface and a second radiating surface, wherein the first radiating surface and the second radiating surface are located on opposite faces of the diaphragm;

a drive unit configured to move the diaphragm along a movement axis at bass frequencies such that the first and second radiating surfaces produce sound at bass frequencies, wherein the sound produced by the first radiating surface is in antiphase with sound produced by the second radiating surface;

a drive unit frame, wherein the diaphragm is suspended from the drive unit frame via at least one drive unit suspension, wherein the drive unit frame is configured to, in use, allow sound produced by the first radiating surface to propagate out from a first side of the dipole loudspeaker and to allow sound produced by the second radiating surface to propagate out from a second side of the dipole loudspeaker; and a mounting frame, wherein the drive unit frame is suspended from the mounting frame via one or more mounting frame suspensions, wherein the one or more mounting frame suspensions, as projected onto a plane perpendicular to the movement axis, at least partially overlap with one or more elements selected from the diaphragm and the at least one drive unit suspension as projected onto the same plane, and wherein at least one mounting frame suspension is formed in a gap between the drive unit frame and the mounting frame and extends substantially continuously around the drive unit frame.

2. The dipole loudspeaker assembly according to claim 1, wherein a gap between the drive unit frame and the mounting frame, as measured in a plane perpendicular to the movement axis is 5 mm or less at one or more locations at a periphery of the drive unit frame.

3. The dipole loudspeaker assembly according to claim 1, wherein the surface area of the first radiating surface is 60 $cm^2$ or more.

4. The dipole loudspeaker assembly according to claim 1, wherein the diaphragm comprises one or more folds, and wherein the one or more folds, when viewed in a circumferential direction, radially extends between an inner circumferential edge and an outer circumferential edge of the diaphragm.

5. The dipole loudspeaker assembly according to claim 1, wherein the at least one mounting frame suspension is configured to have a resonant frequency that is between 10 Hz and 30 Hz.

6. The dipole loudspeaker assembly according to claim 1, wherein the drive unit frame is suspended from the mounting frame via a single mounting frame suspension, wherein the single mounting frame suspension is configured to be positioned on a center of gravity plane when the diaphragm is at rest.

7. The dipole loudspeaker assembly according to claim 1, wherein the drive unit frame is suspended from the mounting frame via two mounting frame suspensions, wherein the two mounting frame suspensions are separated in a direction parallel to the movement axis.

8. The dipole loudspeaker assembly according to claim 7, wherein each mounting frame suspension is configured to be positioned on opposing sides of, and at an equal distance from in a direction parallel to the movement axis, a center of gravity plane when the diaphragm is at rest.

9. The dipole loudspeaker assembly according to claim 7, wherein each mounting frame suspension is a roll suspension, and wherein the two roll suspensions are separated in a direction parallel to the movement axis by part of the mounting frame and/or part of the drive unit frame.

10. The dipole loudspeaker assembly according to claim 1, wherein one or more mounting frame suspensions comprises:
- a piece of elastic material held taut between the mounting frame and the drive unit frame; and/or
- a block of elastic material.

11. The dipole loudspeaker assembly according to claim 1, wherein the dipole loudspeaker assembly is a dipole loudspeaker module configured to be mounted in a headrest of a seat, wherein the dipole loudspeaker module includes:
- one or more attachment formations on the mounting frame, wherein the attachment formations are configured to attach the mounting frame to a headrest of a seat, thereby mounting the dipole loudspeaker module in a headrest of the seat.

12. The dipole loudspeaker assembly according to claim 11, wherein the dipole loudspeaker module includes:
- a first protective grille positioned in front of the first radiating surface of the diaphragm; and/or
- a second protective grille positioned in front of the second radiating surface of the diaphragm.

13. The dipole loudspeaker assembly according to claim 12, wherein one or both of the first and second protective grilles are shaped to follow contours of a surrounding region of the headrest, when the dipole loudspeaker module is mounted in the headrest.

14. The dipole loudspeaker assembly according to claim 13, wherein the dipole loudspeaker module is mounted in the headrest seat, and wherein, for one or both of the first and second protective grilles, the protective grille and the surrounding region of the headrest are covered by a uniform thickness of an open cell foam.

15. The dipole loudspeaker assembly according to claim 1, wherein:
- the drive unit comprises a magnet unit, and a voice coil attached to the diaphragm via a voice coil coupler;
- the magnet unit comprises a permanent magnet, a magnetic yoke, and a steel washer;
- the magnet unit is configured to provide a magnetic field in an air gap, the air gap being provided between the permanent magnet located radially inwards of the air gap with respect to a direction parallel to the movement axis, and the magnetic yoke located radially outwards of the air gap with respect to a direction parallel to the movement axis;
- the voice coil is configured to sit in the air gap when the diaphragm is at rest;
- the voice coil coupler comprises ribs which extend radially outwardly from the voice coil coupler through slots in the magnetic yoke; and
- the ribs of the voice coil coupler extend into an interior of the diaphragm.

16. The dipole loudspeaker assembly according to claim 15, wherein the steel washer comprises a cut out at a location along a direction parallel to the movement axis adjacent the voice coil when the diaphragm is at rest, and wherein the cut out accommodates a shorting ring.

17. A seat assembly, comprising:
- a seat for seating a user; and
- a dipole loudspeaker assembly for producing sound at bass frequencies, the dipole loudspeaker assembly comprising:
  - a dipole loudspeaker, including:
    - a diaphragm having a first radiating surface and a second radiating surface, wherein the first radiating surface and the second radiating surface are located on opposite faces of the diaphragm;
    - a drive unit configured to move the diaphragm along a movement axis at bass frequencies such that the first and second radiating surfaces produce sound at bass frequencies, wherein the sound produced by the first radiating surface is in antiphase with sound produced by the second radiating surface;
    - a drive unit frame, wherein the diaphragm is suspended from the drive unit frame via at least one drive unit suspension, wherein the drive unit frame is configured to, in use, allow sound produced by the first radiating surface to propagate out from a first side of the headrest and to allow sound produced by the second radiating surface to propagate out from a second side of the headrest; and
    - a mounting frame, wherein the drive unit frame is suspended from the mounting frame via one or more mounting frame suspensions,
- wherein the one or more mounting frame suspensions, as projected onto a plane perpendicular to the movement axis, at least partially overlap with one or more elements selected from the diaphragm and the at least one drive unit suspension as projected onto the same plane,
- wherein at least one mounting frame suspension is formed in a gap between the drive unit frame and the mounting frame and extends substantially continuously around the drive unit frame, and
- wherein the dipole loudspeaker is mounted in a headrest of the seat.

18. The seat assembly according to claim 17, wherein the headrest further comprises one or more directional mid-high frequency loudspeakers.

19. The dipole loudspeaker assembly according to claim 1, wherein the one or more mounting frame suspensions are configured to have a resonant frequency that is below the frequency spectrum over which the dipole loudspeaker is configured to operate.

20. The dipole loudspeaker assembly according to claim 1, wherein the one or more mounting frame suspensions extend from the drive unit frame to the mounting frame along a path which extends away from the movement axis.

21. The dipole loudspeaker assembly according to claim 1, wherein a height of the one or more mounting frame suspensions along the movement axis is smaller than a height of the drive unit frame along the movement axis.

* * * * *